(12) United States Patent
Shinohara

(10) Patent No.: US 12,101,560 B2
(45) Date of Patent: Sep. 24, 2024

(54) GOLF DIGEST CREATING SYSTEM, MOBILE IMAGING UNIT, AND DIGEST CREATING DEVICE

(71) Applicant: KYOEISEIKO CORPORATION, Moka (JP)

(72) Inventor: Atsushi Shinohara, Moka (JP)

(73) Assignee: KYOEISEIKO CORPORATION, Moka (JP)

( * ) Notice: Subject to any disclaimer, the term of this patent is extended or adjusted under 35 U.S.C. 154(b) by 185 days.

(21) Appl. No.: 17/984,079

(22) Filed: Nov. 9, 2022

(65) Prior Publication Data

US 2023/0075621 A1    Mar. 9, 2023

Related U.S. Application Data

(63) Continuation of application No. PCT/JP2022/000445, filed on Jan. 10, 2022.

(30) Foreign Application Priority Data

Jan. 16, 2021  (JP) ................................. 2021-005415

(51) Int. Cl.
*H04N 23/695* (2023.01)
*A63B 57/00* (2015.01)
(Continued)

(52) U.S. Cl.
CPC .......... *H04N 23/695* (2023.01); *A63B 57/00* (2013.01); *H04N 5/775* (2013.01); *H04N 23/69* (2023.01); *H04N 23/698* (2023.01)

(58) Field of Classification Search
CPC .................................................... H04N 23/695
See application file for complete search history.

(56) References Cited

U.S. PATENT DOCUMENTS 10,715,725 B2 * 7/2020 Bhoraskar .............. H04N 23/69
2013/0162852 A1 * 6/2013 Boyle ................ H04N 23/6812
348/211.99
(Continued)

FOREIGN PATENT DOCUMENTS

JP    2003111883 A    4/2003
JP    2005034529 A    2/2005
(Continued)

*Primary Examiner* — Daniel T Tekle
(74) *Attorney, Agent, or Firm* — Rabin & Berdo, P.C.

(57) ABSTRACT

A mobile imaging unit includes a 360-degree camera disposed on a golf cart, a motorized-zoom-lens-equipped camera on a motorized camera platform, a microphone, a GPS receiver, and a direction detector of a lens. The mobile imaging unit determines an imaging target area of the motorized-zoom-lens-equipped camera by using a current position and golf course map information, drives the motorized camera platform, and stores video data captured in a magnified state, with the video data being accompanied by time information and area identification information. A digest creating device selects, as video data to be subjected to image analysis and extraction of a highlight scene, either video data from the 360-degree camera or video data from the motorized-zoom-lens-equipped camera in accordance with the area identification information accompanying the stored video data.

8 Claims, 30 Drawing Sheets

(51) Int. Cl.
*H04N 5/775* (2006.01)
*H04N 23/69* (2023.01)
*H04N 23/698* (2023.01)

(56) References Cited

U.S. PATENT DOCUMENTS

| | | | | |
|---|---|---|---|---|
| 2015/0340875 | A1* | 11/2015 | Prasad | H02J 50/60 |
| | | | | 307/104 |
| 2016/0366330 | A1* | 12/2016 | Boliek | G11B 27/005 |
| 2019/0306422 | A1* | 10/2019 | Bhoraskar | H04N 23/69 |
| 2020/0167959 | A1* | 5/2020 | Shen | G08B 13/1963 |
| 2020/0401022 | A1* | 12/2020 | Dong | F16M 11/10 |

FOREIGN PATENT DOCUMENTS

| | | |
|---|---|---|
| JP | 2005253858 A | 9/2005 |
| JP | 2020088855 A | 6/2020 |

* cited by examiner

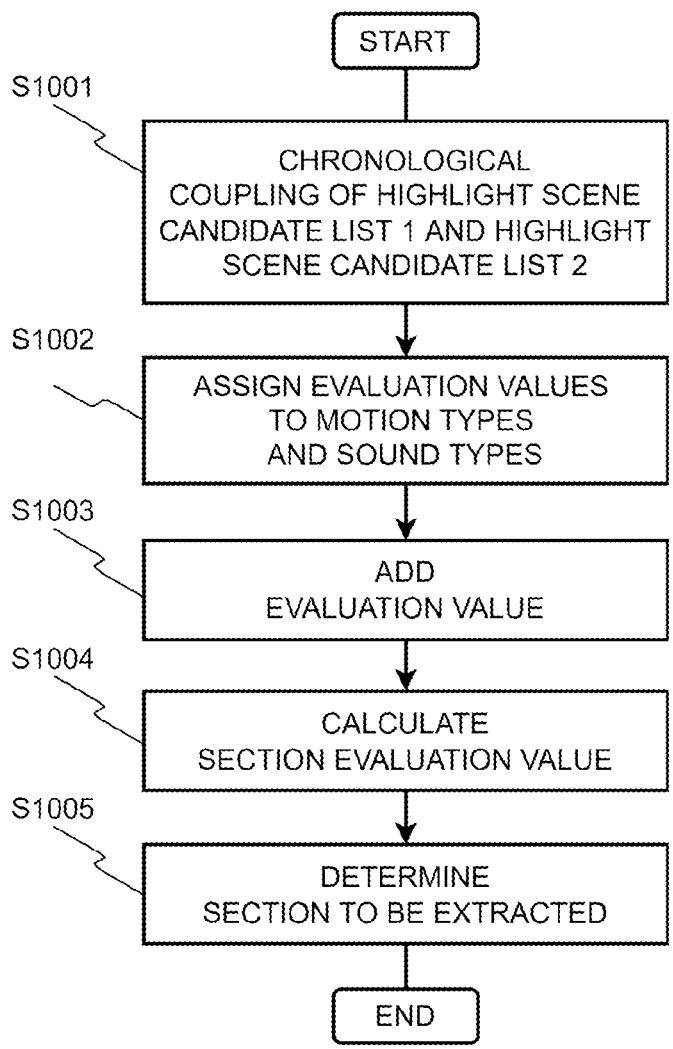

FIG.16A

| | MOTION | SOUND | SOUND | MOTION | | MOTION |
|---|---|---|---|---|---|---|
| MOTION TYPE / SOUND TYPE | SWINGING | SHOT SOUND | CHEER | JUMPING | | HAND RAISING |
| | △ | △ | △ | △ | | △ |
| RECORDING TIME | 03'18" | 03'19" | 03'21" | 03'23" | | 04'11" |
| | 03'13" | | | 03'24" | | 04'06"   04'12" |
| EVALUATION VALUE | 6 | 6 | 6 | 4 | | 4 |
| SECTION EVALUATION VALUE | 22 | | | | | 4 |

FIG.16B

| | MOTION | | SOUND | MOTION |
|---|---|---|---|---|
| MOTION TYPE / SOUND TYPE | PUTTING | | CHEER | HAND RAISING |
| | △ | | △ | △ |
| RECORDING TIME | 19'08" | | 19'13" | 19'14" |
| | 19'03" | | | 19'15" |
| EVALUATION VALUE | 6+4 | | 6+4 | 4+4 |
| SECTION EVALUATION VALUE | 28 | | | |

GOLF DIGEST CREATING SYSTEM, MOBILE IMAGING UNIT, AND DIGEST CREATING DEVICE

CROSS REFERENCES TO RELATED APPLICATIONS

The present application is a continuation application of PCT/JP2022/000445, filed Jan. 10, 2022, which claims priority to Japanese Patent Application No. 2021-005415, filed Jan. 16, 2021. The contents of these applications are incorporated herein by reference in their entirety.

BACKGROUND OF THE INVENTION

1. Field of the Invention

The present invention relates to a golf digest creating system that automatically performs a process from shooting of play during a golf round to creation of a digest of highlight scenes.

2. Description of the Related Art

Japanese Unexamined Patent Application Publication No. 2020-88855 describes a system that shoots play during a golf round and provides a movie to a player after the play. FIG. 28 is a diagram of a mobile imaging unit included in the existing golf digest creating system described in Japanese Unexamined Patent Application Publication No. 2020-88855.

Referring to FIG. 28, the mobile imaging unit includes a 360-degree camera 311 disposed at a position in an upper part of a golf cart, the position having a view of 360 degrees; a microphone 312 disposed on the golf cart; an audio-visual (AV) storage 313 configured to store video data from the 360-degree camera 311 and audio data from the microphone 312; and a controller 314 configured to store the video data and the audio data in the AV storage 313, with the video data and the audio data being accompanied by time information for synchronizing the video data and the audio data with each other. A digest creating device of the golf digest creating system includes a data analyzer configured to perform image analysis on the video data stored in the AV storage of the mobile imaging unit and/or audio analysis on the audio data stored in the AV storage; and a digest creator configured to extract a highlight scene in accordance with a result made by the data analyzer.

Japanese Unexamined Patent Application Publication No. 2003-111883 describes a system capable of easily accumulating video, audio, scores, course situations, and so forth during play as a library. FIG. 29 and FIG. 30 illustrate examples of display screens in the existing golf play library system described in Japanese Unexamined Patent Application Publication No. 2003-111883.

In this golf play library system, when a player captures an image by pressing a shooting button during play, the image is stored in an image/audio file, and link information linking the image with a hole in the play, for example, a green, is added. Accordingly, when the player points the green on the screen in the mode of displaying a recorded image illustrated in FIG. 29 after a round, the image linked to the green is displayed as illustrated in FIG. 30.

SUMMARY OF THE INVENTION

However, the mobile imaging unit described in Japanese Unexamined Patent Application Publication No. 2020-88855 of the related art has an issue that, if shooting has to be performed when a golf cart is away from a golf player, it is impossible to record video such that the movement of a ball after a shot, the rolling of a ball on a green, or the like is clearly visible.

There is also an issue that only video of a highlight scene (a scene of interest) is insufficient to recognize detailed undulations at a spot of the scene.

The golf play library system described in Japanese Unexamined Patent Application Publication No. 2003-111883 has an issue that a player has to perform shooting during play and is unable to concentrate on play, and that the player can recognize the undulation at a shot spot only from video.

The present invention has been made to address the above-described issues of the related art, and an object of the present invention is to provide a golf digest creating system that automatically creates a golf round digest that enables a player to recognize the state of rolling of a golf ball or undulations at a shot spot in a highlight scene on a golf course, without being concerned about shooting.

To address the above-described issues of the related art, a golf digest creating system according to the present invention includes a mobile imaging unit and a digest creating device.

The mobile imaging unit includes a 360-degree camera disposed at a position in an upper part of a golf cart, the position having a view of 360 degrees; a motorized-zoom-lens-equipped camera attached to a motorized camera platform disposed on the golf cart; a microphone and a Global Positioning System (GPS) receiver that are disposed on the golf cart; a direction detector configured to detect a lens direction of the motorized-zoom-lens-equipped camera; a course information storage storing map information of a golf course; an audio-visual (AV) storage configured to store first video data from the 360-degree camera, second video data from the motorized-zoom-lens-equipped camera, and audio data from the microphone; and a controller configured to determine an imaging target area by using position information detected by the GPS receiver and the map information, drive the motorized camera platform so that the lens direction detected by the direction detector is directed toward the imaging target area, and store the second video data captured in a magnified state by the motorized-zoom-lens-equipped camera, the first video data from the 360-degree camera, and the audio data in the AV storage, with the first video data, the second video data, and the audio data being accompanied by time information for synchronizing the first video data, the second video data, and the audio data with each other, and being accompanied by area identification information identifying the imaging target area.

The digest creating device includes a data analyzer configured to perform image analysis on the first video data and the second video data stored in the AV storage and/or audio analysis on the audio data stored in the AV storage; a digest creator configured to extract a highlight scene in accordance with a result made by the data analyzer; and a controller configured to select, as video data to be subjected to the image analysis and extraction of the highlight scene, either the first video data from the 360-degree camera or the second video data from the motorized-zoom-lens-equipped camera in accordance with the area identification information accompanying the first video data and the second video data.

With this configuration, even if the 360-degree camera is incapable of recording video such that a ball and so forth are visually recognizable, the motorized-zoom-lens-equipped camera is capable of recording video such that the ball and so forth are clearly and visually recognizable. Thus, even if play is performed at a distance from the golf cart, the movement of a ball and so forth in the play can be checked in a digest.

The controller of the mobile imaging unit according to the present invention is configured to, in a case where the position information detected by the GPS receiver indicates a position beside a green in the map information, determine the green to be an imaging target area of the motorized-zoom-lens-equipped camera.

This makes it possible to check the state of rolling of a ball on the green in a digest video.

The controller of the mobile imaging unit according to the present invention is configured to, in a case where the position information detected by the GPS receiver indicates a position that is not beside a green in the map information, determine a predetermined area in the map information to be the imaging target area, the predetermined area being a next fall area of a ball hit at the position indicated by the position information.

This makes it possible to check the movement of the ball after a shot in a digest video because the motorized-zoom-lens-equipped camera shoots the area where the ball is expected to fall after the shot when play is performed at a place that is not beside a green.

The controller of the digest creating device according to the present invention is configured to, in a case where the area identification information accompanying the first video data and the second video data indicates a green, select the second video data from the motorized-zoom-lens-equipped camera as the video data to be subjected to the image analysis and extraction of the highlight scene.

This makes it possible to check the state of rolling of a ball on the green in a digest video because the video of the play on the green is captured by the motorized-zoom-lens-equipped camera.

The controller of the digest creating device according to the present invention is configured to, in a case where the area identification information accompanying video data of the highlight scene does not indicate a green, replace the video data of the highlight scene after a shot with video data that is from the motorized-zoom-lens-equipped camera and that has the same time as the video data of the highlight scene.

This makes it possible to check the direction and carry of a hit ball in a digest video because the video after a shot is accompanied by the video of an expected next fall area.

The golf digest creating system according to the present invention further includes a mobile terminal including a GPS receiver and configured to record position information at a predetermined time interval to create movement trace information of a player. The 360-degree camera of the mobile imaging unit includes an azimuth sensor and is configured to attach azimuth information to the first video data to be output. The controller of the mobile imaging unit is configured to store the first video data and the second video data in the AV storage, with the first video data and the second video data being accompanied by the position information of the golf cart. The digest creating device further includes a map information storage storing three-dimensional map information of the golf course. The digest creator is configured to specify a position of the player by using the azimuth information accompanying the first video data from the 360-degree camera, the position information of the golf cart, and the movement trace information acquired from the mobile terminal, at a time of occurrence of the highlight scene, calculate topographic information at the position by using the three-dimensional map information, and combine the topographic information with video data of the highlight scene.

This makes it possible to check the undulations of the point where a ball is hit in a digest video.

A mobile imaging unit according to the present invention includes a 360-degree camera disposed at a position in an upper part of a golf cart, the position having a view of 360 degrees; a motorized-zoom-lens-equipped camera attached to a motorized camera platform disposed on the golf cart; a microphone and a Global Positioning System (GPS) receiver that are disposed on the golf cart; a direction detector configured to detect a lens direction of the motorized-zoom-lens-equipped camera; a course information storage storing map information of a golf course; an audio-visual (AV) storage configured to store first video data from the 360-degree camera, second video data from the motorized-zoom-lens-equipped camera, and audio data from the microphone; and a controller configured to determine an imaging target area by using position information detected by the GPS receiver and the map information, drive the motorized camera platform so that the lens direction detected by the direction detector is directed toward the imaging target area, and store the second video data captured in a magnified state by the motorized-zoom-lens-equipped camera, the first video data from the 360-degree camera, and the audio data in the AV storage, with the first video data, the second video data, and the audio data being accompanied by time information for synchronizing the first video data, the second video data, and the audio data with each other, and being accompanied by area identification information identifying the imaging target area.

With this configuration, even if the 360-degree camera is incapable of recording video such that a ball and so forth are visually recognizable, the motorized-zoom-lens-equipped camera is capable of recording video such that the ball and so forth are clearly and visually recognizable. In addition, an area in a golf course can be identified in the video.

A digest creating device according to the present invention includes a digest creation audio-visual (AV) storage configured to store first video data from a 360-degree camera disposed on a golf cart, second video data from a motorized-zoom-lens-equipped camera attached to a motorized camera platform, and audio data from a microphone disposed on the golf cart, with the first video data, the second video data, and the audio data being accompanied by time information for synchronizing the first video data, the second video data, and the audio data with each other, and being accompanied by area identification information identifying an imaging target area; a data analyzer configured to perform image analysis on the first video data and/or the second video data stored in the digest creation AV storage and/or audio analysis on the audio data stored in the digest creation AV storage; a digest creator configured to extract a highlight scene in accordance with a result made by the data analyzer; and a controller configured to select, as video data to be subjected to the image analysis and extraction of the highlight scene, either the first video data from the 360-degree camera or the second video data from the motorized-zoom-lens-equipped camera in accordance with the area identification information accompanying the first video data and the second video data.

With this configuration, the digest creating device is capable of creating a digest by using video recorded by the motorized-zoom-lens-equipped camera such that a ball and so forth are clearly visible, instead of using video recorded by the 360-degree camera such that a ball and so forth are visually unrecognizable, in accordance with the imaging target area. Thus, it is possible to check the movement of a hit ball and the state of rolling of a ball in a digest.

According to the above present invention, it is possible to automatically create a digest that enables a video viewer to clearly and visually recognize the movement of a hit ball and rolling of a ball on a green in a highlight scene on a golf course, and recognize undulations at a shot spot, without a player being concerned about shooting.

BRIEF DESCRIPTION OF THE DRAWINGS

FIG. 15 is an operation flowchart describing a highlight scene determination process according to the first embodiment of the present invention;

FIG. 16A is a diagram describing a process of assigning evaluation values to motion types and sound types according to the first embodiment of the present invention;

FIG. 16B is a diagram describing a process of assigning evaluation values to motion types and sound types according to the first embodiment of the present invention;

DESCRIPTION OF THE PREFERRED EMBODIMENTS

Hereinafter, embodiments of the present invention will be described with reference to the drawings.

First Embodiment

Figure 1:
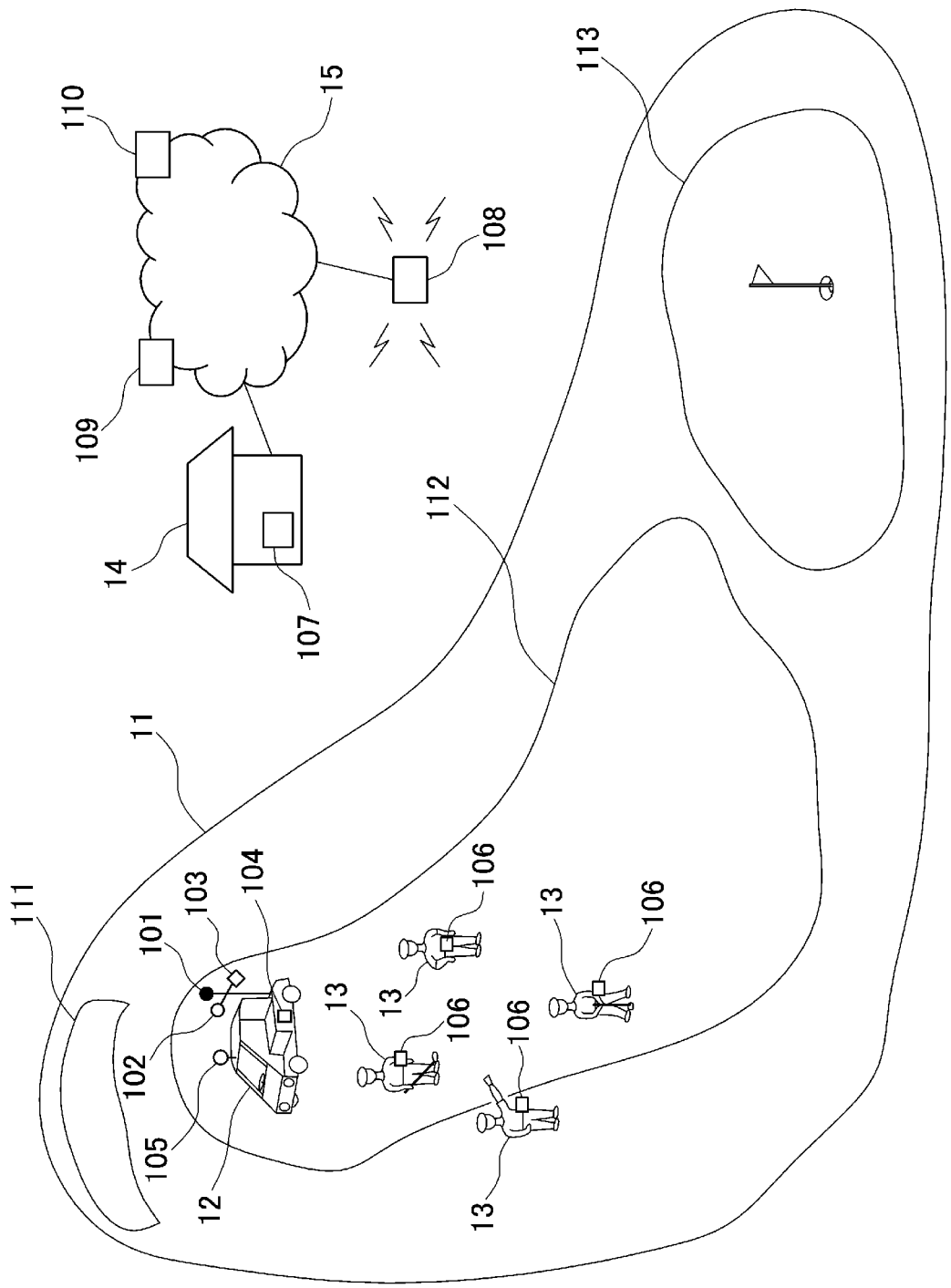
FIG. 1 is a diagram illustrating an overview of a golf digest creating system according to a first embodiment of the present invention.

FIG. 1 is a diagram illustrating an overview of a golf digest creating system according to a first embodiment of the present invention.

Golf is a sport in which players compete for the total number of shots of hitting a golf ball from a teeing area 111 to the hole in a green 113 while moving around all the golf courses of 18 holes in a determined order.

Referring to FIG. 1, a golf course 11 is one of 18 holes. A golf cart 12, on which a player 13 rides to move on the course, is equipped with a 360-degree camera 101 capable of performing omnidirectional shooting, a motorized camera platform, a motorized-zoom-lens-equipped camera 105 attached to the motorized camera platform, a nondirectional microphone 102, a Global Positioning System (GPS) receiver 103, and a mobile recording device 104 having a wireless communication function. In particular, the 360-degree camera 101 is disposed at a position having a view of 360 degrees, above the roof of the golf cart 12.

The 360-degree camera 101 and the motorized-zoom-lens-equipped camera 105 have a resolution of 4K (3,840 pixels×2,160 pixels) or 8K (7,680 pixels×4,320 pixels). Video data from the 360-degree camera 101 and the motorized-zoom-lens-equipped camera 105, and audio data from the microphone 102 are transmitted to the mobile recording device 104 in a wired or wireless manner. Alternatively, the 360-degree camera 101 may be configured to cover 360 degrees by using a plurality of cameras, and combine images together. The motorized-zoom-lens-equipped camera 105 is equipped with a motorized optical zoom lens capable of changing the focal length and the angle of view of the optical lens. The motorized camera platform can be driven to tilt, pan, and roll.

These devices mounted on or in the golf cart 12 constitute a mobile imaging unit. The mobile imaging unit automatically records video and audio of a 360-degree area around the golf cart 12 during play, and zoomed-in video of an area or green where a ball is expected to fall next.

A mobile terminal 106 worn by the player 13 on the waist or the like includes a GPS receiver, and records a movement trace of the player 13 together with time information.

A golf course terminal 107 is disposed in a club house 14. The player or the like operates a screen of the golf course terminal 107 to provide an instruction to create a desired digest movie or write a digest movie on a digital versatile disc (DVD) or the like.

A digest creating device 109 and a digest distribution server 110 exist on an Internet 15, perform data communication in a wired manner with the golf course terminal 107 in the golf course, and perform data communication with the mobile imaging unit via a wireless base station 108. The digest creating device 109 receives movie data (hereinafter including both "video data" and "audio data") recorded by the mobile recording device 104 mounted in the golf cart 12, and analyzes video data and audio data to create a digest of highlight scenes of play.

Figure 2:
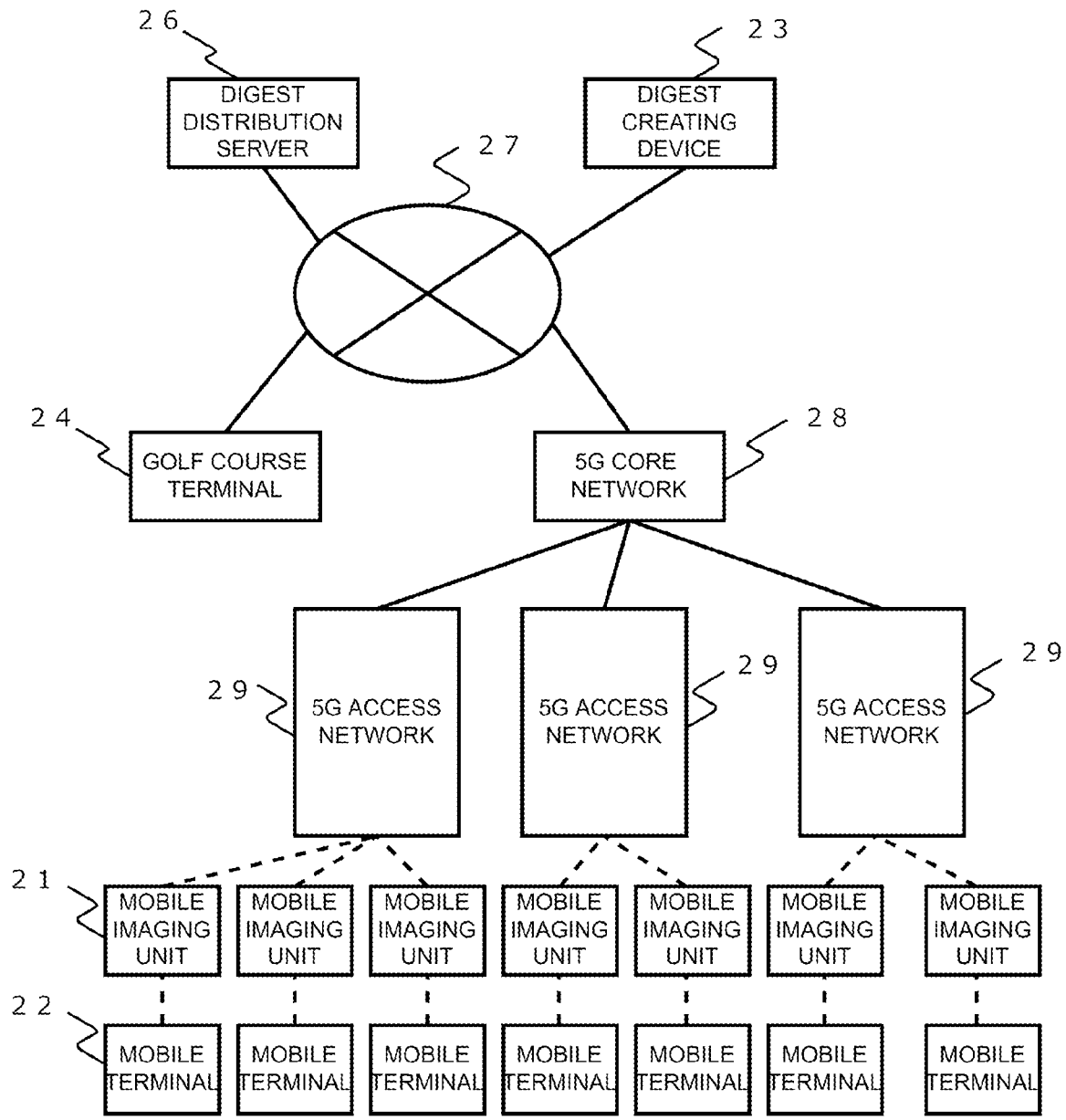
FIG. 2 is a diagram illustrating the configuration of the golf digest creating system according to the first embodiment of the present invention.

FIG. 2 is a diagram illustrating the configuration of the golf digest creating system according to the present embodiment.

Referring to FIG. 2, a mobile imaging unit 21 performs wireless interactive communication with a mobile terminal 22, and also performs fifth generation mobile communication (5G) with a digest creating device 23 existing on an Internet 27. The fifth generation mobile communication (5G) system is constituted by user equipment (UE), 5G access networks (5G-AN) 29, and a 5G core network (5GCN) 28. Each 5G access network (5G-AN) 29 is a fifth generation wireless network part that directly transmits and receives radio waves to and from UE, whereas the 5G core network 28 is a fifth generation wireless network part that comprehensively performs connection processing and routing processing of user data. The 5G access networks (5G-AN) 29 and the 5G core network (5GCN) 28 are described, for example, on pages 218 to 241 of a literature "5G Textbook (LTE/IoT to 5G)" (published by Impress Corporation).

The mobile imaging unit 21 according to the present embodiment corresponds to the above UE, and includes a 5G wireless transmitter/receiver capable of interactive communication with a fifth generation wireless base station using a new radio interface (hereinafter referred to as NR). The NR is described on pages 108 to 117 of the above-mentioned literature "5G Textbook (LTE/IoT to 5G)". The NR has a communication capability of achieving a data rate of up to 20 Gbps in the downlink and up to 10 Gbps in the uplink.

A golf course terminal 24 is a typical personal computer having a DVD writing function and a network interface (I/f), and performs wired interactive communication with the digest creating device 23.

A digest distribution sever 26 is a computer including a large-capacity storage device and a network I/F. The digest distribution sever 26 receives digest data from the digest creating device 23, and stores or accumulates the digest data, with individual IDs or URLs being assigned thereto. In addition, the digest distribution sever 26 accepts a transmission request for digest data designated by an ID or URL from the outside, and transfers a digest data file or distributes a digest data file by streaming to a terminal (smartphone or personal computer) requesting transmission.

Figure 3:
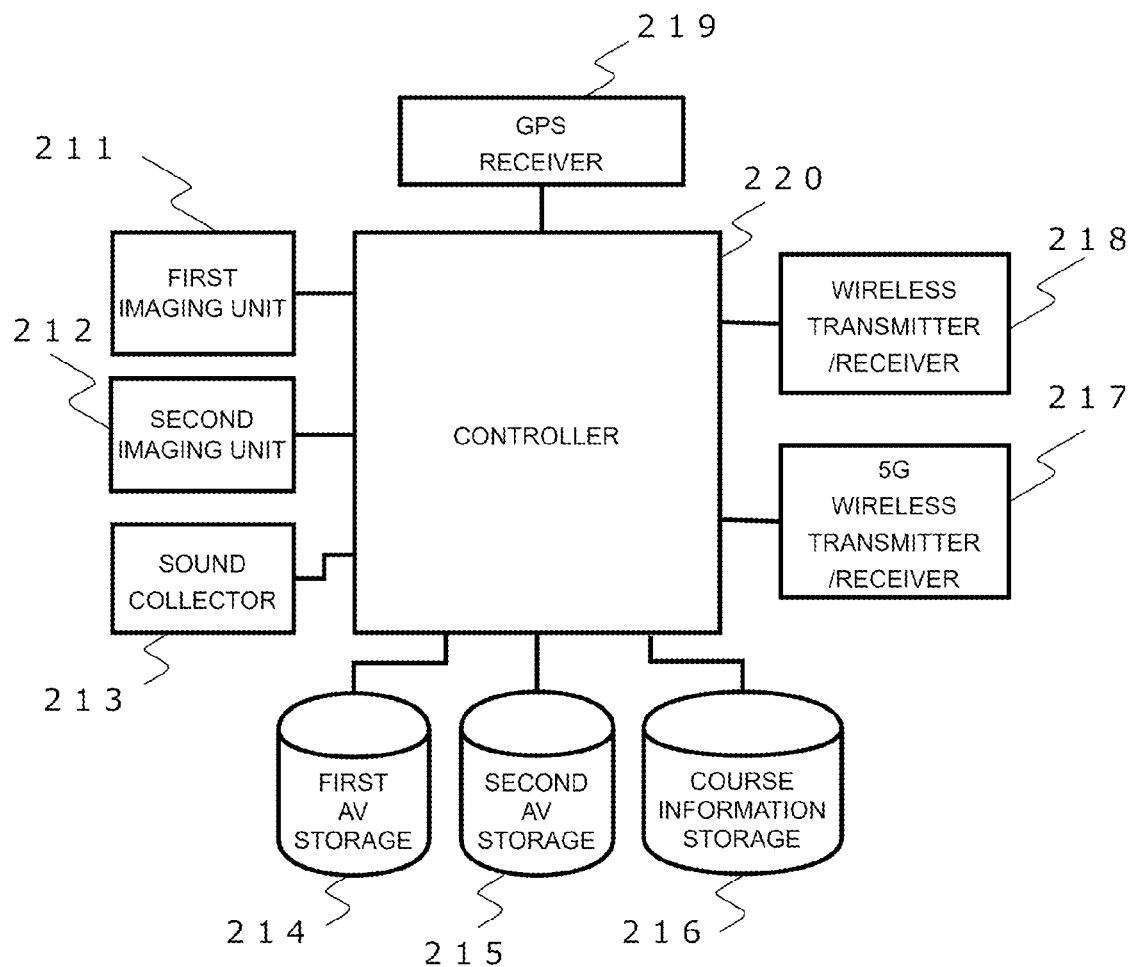
FIG. 3 is a diagram illustrating the hardware configuration of a mobile imaging unit according to the first embodiment of the present invention.

FIG. 3 is a diagram illustrating the hardware configuration of the mobile imaging unit 21 included in the golf digest creating system.

Referring to FIG. 3, the mobile imaging unit 21 includes a first imaging unit 211, a second imaging unit 212, a sound collector 213, a first audio-visual (AV) storage 214, a second AV storage 215, a course information storage 216, a 5G wireless transmitter/receiver 217, a wireless transmitter/receiver 218, a GPS receiver 219, and a controller 220.

The first imaging unit 211 includes a 360-degree camera, and transmits video data from the 360-degree camera to the first AV storage 214. At that time, the first imaging unit 211 corrects distortion caused by a wide-angle lens of the 360-degree camera, and outputs the corrected video data. The distortion correction is performed in real time by using an application specific integrated circuit (ASIC) having a known algorithm incorporated therein.

Figure 7A:
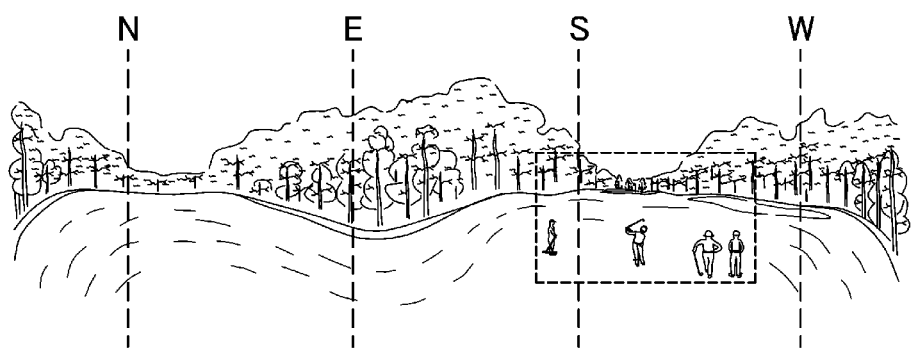
FIG. 7A is a diagram illustrating an example of one frame image of video data according to the first embodiment of the present invention.

Furthermore, the 360-degree camera includes an azimuth sensor, and outputs captured video data with azimuth information attached thereto. FIG. 7A illustrates an example of one frame image of the video data. In FIG. 7A, the letters N, E, S, and W with dotted lines indicate the azimuths of north, east, south, and west, respectively.

Figure 6:
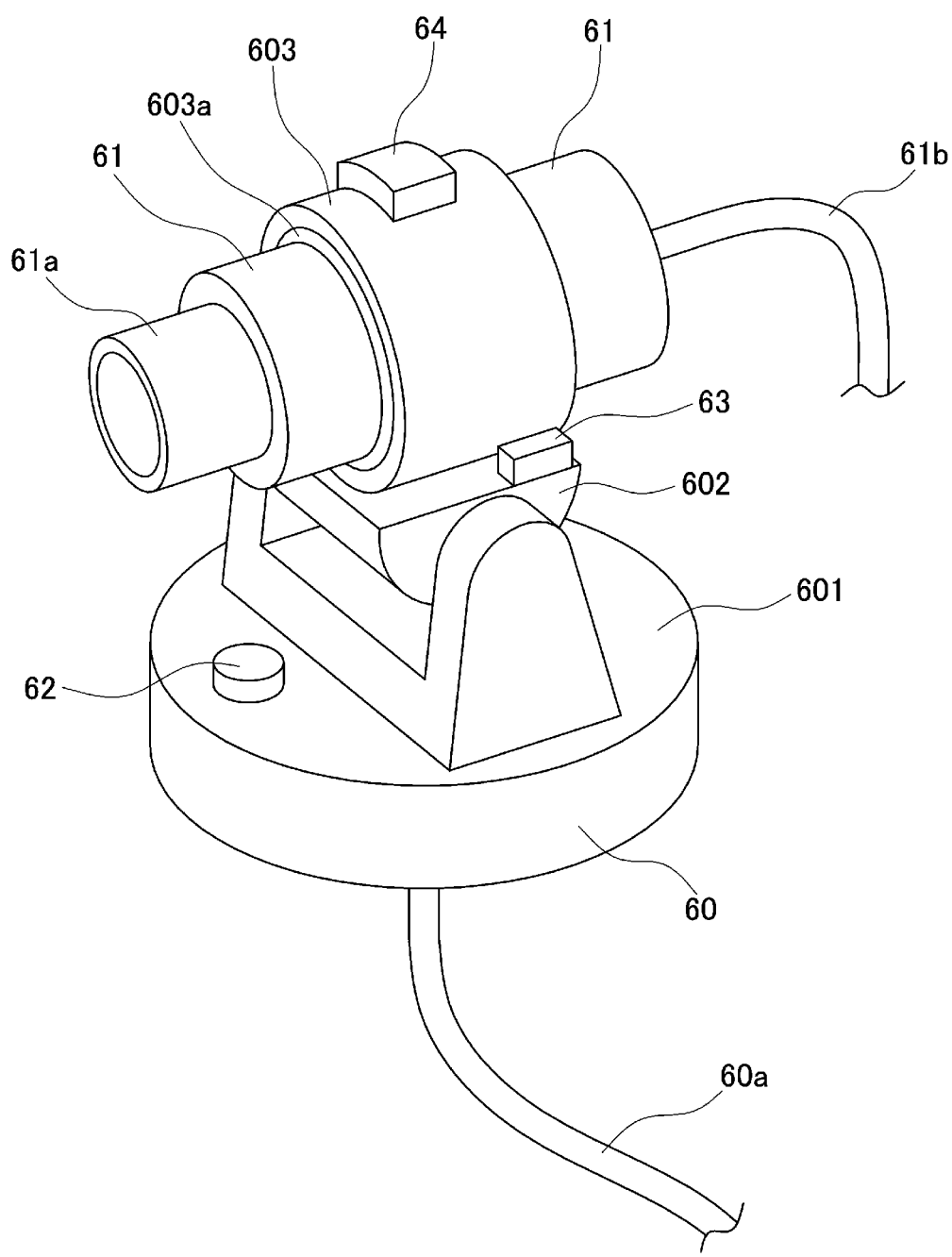
FIG. 6 is an external appearance diagram of a motorized camera platform having a motorized zoom lens mounted thereon according to the first embodiment of the present invention.

The second imaging unit 212 includes a motorized camera platform and a motorized-zoom-lens-equipped camera attached thereto. FIG. 6 is a diagram illustrating a motorized camera platform 60, and a motorized zoom lens 61 of a motorized-zoom-lens-equipped camera attached thereto. Referring to FIG. 6, the motorized zoom lens 61 is connected to a video camera body (not illustrated) through an electric signal cable 61b, and the motorized camera platform 60 is connected to a mobile recording device (not illustrated) through an electric cable 60a.

Referring to FIG. 6, the motorized camera platform 60 is constituted by a pan rotation portion 601, a tilt rotation portion 602, and a roll rotation portion 603, which respectively include a pan driving motor, a tilt driving motor, and a roll driving motor. The motorized zoom lens 61 is fixed to a rotary cylinder 603a of the roll rotation portion 603. An azimuth sensor 62 is attached to the pan rotation portion 601, an inclination sensor 63 that detects an elevation angle is attached to the tilt rotation portion 602, and an inclination sensor 64 that detects a roll angle is attached to the roll rotation portion 603. The roll rotation portion 603 rotates the rotary cylinder 603a in a direction of cancelling the angle detected by the inclination sensor 64, thereby constantly maintaining the horizontal state of the motorized zoom lens 61.

The motorized zoom lens 61 includes a lens moving motor, and is capable of driving a zoom lens 61a to change the focal length or angle of view in response to an electric signal from the video camera body.

With this configuration, the second imaging unit 212 directs the optical zoom lens in a designated direction on the basis of detection values of the azimuth sensor 62 and the inclination sensors 63 while constantly keeping the optical zoom lens horizontal by rolling correction, and transmits video data zoomed at a designated magnification to the second AV storage 215.

The sound collector 213 includes the microphone 102, and transmits audio data from the microphone 102 to the first AV storage 214 and the second AV storage 215.

The GPS receiver 219 includes a GPS receiver, receives a signal from a satellite, and outputs current position information and time information.

The first AV storage 214 stores video data from the first imaging unit 211 and audio data from the sound collector 213. The second AV storage 215 stores video data from the second imaging unit 212 and audio data from the sound collector 213. Each of the first AV storage 214 and the second AV storage 215 is a nonvolatile storage device using a hard disk or a semiconductor memory card as a recording medium, and may preferably be a semiconductor memory card excellent in shock resistance.

Figure 8:
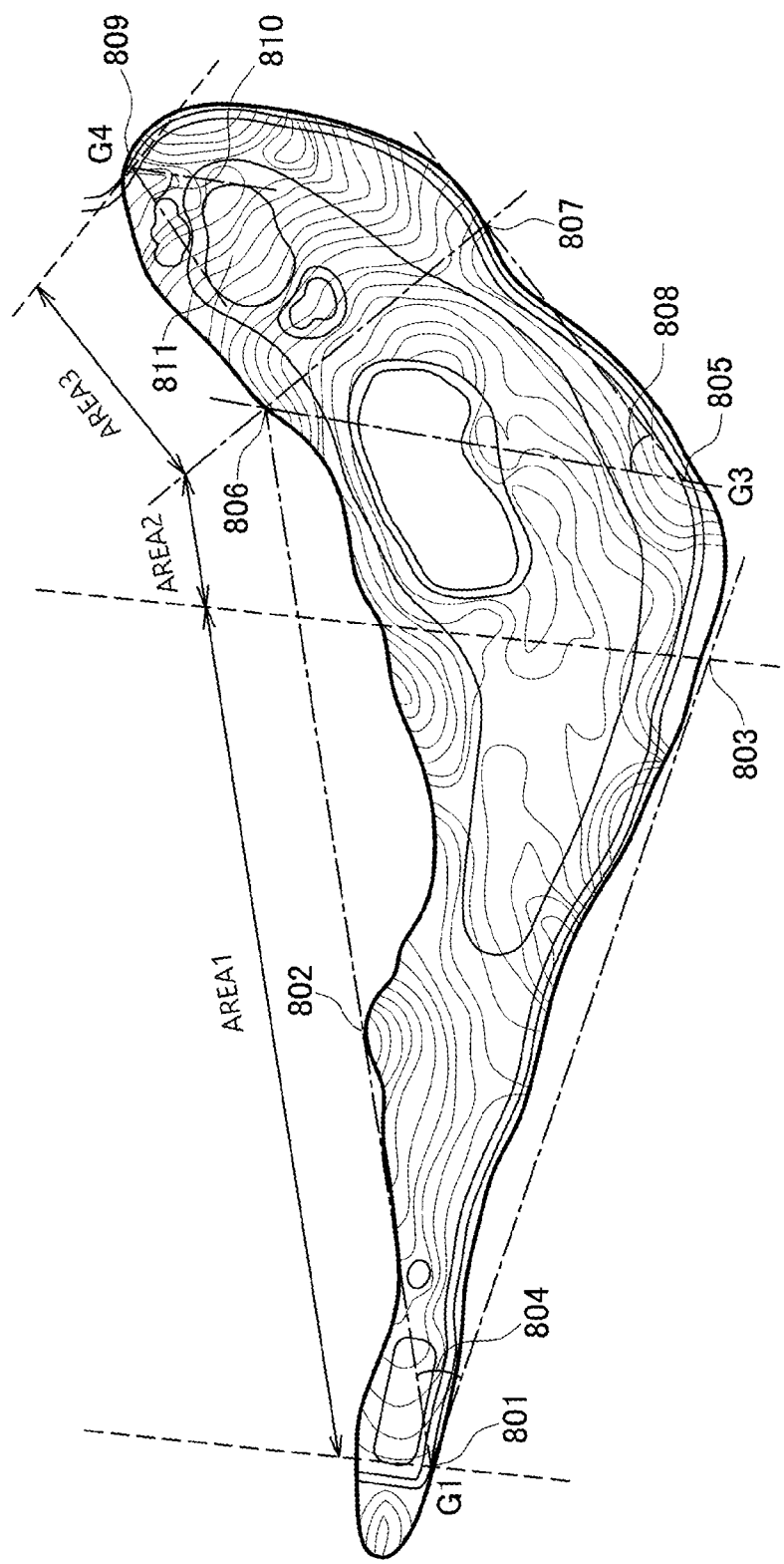
FIG. 8 illustrates a contour map showing one hole of a golf course according to the first embodiment of the present invention.

The course information storage 216 is also a nonvolatile storage device and stores three-dimensional map information of all the holes of the golf course. FIG. 8 illustrates a contour map showing one hole of a golf course. In FIG. 8, although contour lines are partially omitted, the three-dimensional map information in the present embodiment is composed of the latitudes, longitudes, and altitudes of individual points obtained by dividing the contour map created at an altitude interval of 1 cm into a mesh of 5 cm square, and is stored for each hole. As illustrated in FIG. 8, each hole is divided into two to four areas in accordance with the reference number of shots. Specifically, a hole in which the reference number of shots is 3 is divided into area 1 and area 2, a hole in which the reference number of shots is 4 is divided into area 1 to area 3, and a hole in which the reference number of shots is 5 is divided into area 1 to area 4. The points on the outer contour of the hole and a boundary line between the areas are stored as area information.

The 5G wireless transmitter/receiver 217 performs high-speed wireless communication with the above-described fifth generation wireless base station.

The wireless transmitter/receiver 218 performs medium-range wireless communication (IEEE 802.11) and is capable of communication over several hundred meters.

The controller 220 controls the mobile imaging unit 21 as a whole, writes video data from the first imaging unit 211 and audio data from the sound collector 213 into the first AV storage 214, and writes video data from the second imaging unit 212 and audio data from the sound collector 213 into the second AV storage 215. These pieces of video data are captured at a frame rate of 20 fps to 60 fps, and individual frames are recorded with an elapsed time (time code) from the start of image capturing attached thereto. In addition, the audio data is recorded with time information (time code) synchronized with the individual frames attached thereto. The controller 220 instructs the motorized camera platform of the second imaging unit 212 about the rotation angle in the pan direction and the rotation angle in the tilt direction, and instructs the motorized-zoom-lens-equipped camera about the zoom magnification.

Furthermore, the controller 220 calculates, from the position information acquired from the GPS receiver 219 and the three-dimensional map information, the hole number of the hole in which the golf cart is currently stopped, and records, on the pieces of video data, position information of the golf cart, the hole number, and area identification information identifying a target imaging area.

What is obtained by removing the 360-degree camera 101, the motorized camera platform 60, the motorized-zoom-lens-equipped camera 105, the microphone 102, and the GPS receiver 103 from the above-described mobile imaging unit 21 corresponds to the above-described mobile recording device 104, which is implemented by a wireless communication device and a computer device. The computer device includes a central processing unit (CPU), a memory, a nonvolatile storage, an input/output interface, and a wireless communication interface, which are connected to each other via a bus. In particular, the controller 220 loads a control program stored in the nonvolatile storage into the memory and executes the program, thereby implementing functions.

In the mobile imaging unit according to the present invention, an AV storage corresponds to the first AV storage 214 and the second AV storage 215, a direction detector corresponds to the azimuth sensor 62 and the inclination sensor 63, and map information corresponds to the three-dimensional map information. Next, the hardware configuration of the mobile terminal 22 will be described.

Figure 4:
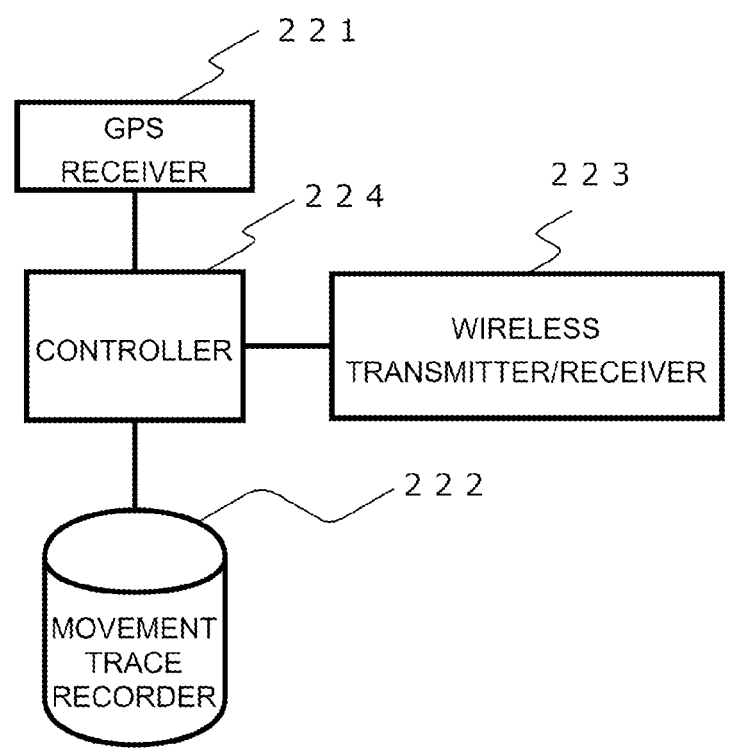
FIG. 4 is a diagram illustrating the hardware configuration of a mobile terminal according to the first embodiment of the present invention.

FIG. 4 is a diagram illustrating the hardware configuration of the mobile terminal 22 according to the present embodiment.

Referring to FIG. 4, the mobile terminal 22 includes a GPS receiver 221, a movement trace recorder 222, a wireless transmitter/receiver 223, and a controller 224.

The GPS receiver 221 includes a GPS receiver, receives a signal from a satellite, and outputs current position information and time information.

The movement trace recorder 222 is a nonvolatile memory, and stores information obtained by recording, at predetermined time intervals, points to which the player carrying the mobile terminal 22 moves during golf play (hereinafter referred to as "movement trace information").

The wireless transmitter/receiver 223 performs wireless communication (IEEE 802.11) and is capable of communication over several hundred meters. The controller 224 controls the mobile terminal 22 as a whole.

The mobile terminal 22 is implemented by a GPS receiver, a wireless communication device, and a computer device. The computer device includes a CPU, a memory, a nonvolatile storage, an input/output interface, and a wireless communication interface, which are connected to each other via a bus. In particular, the controller 224 loads a control program stored in the nonvolatile storage into the memory and executes the program, thereby implementing functions.

Next, the hardware configuration of the digest creating device 23 will be described.

Figure 5:
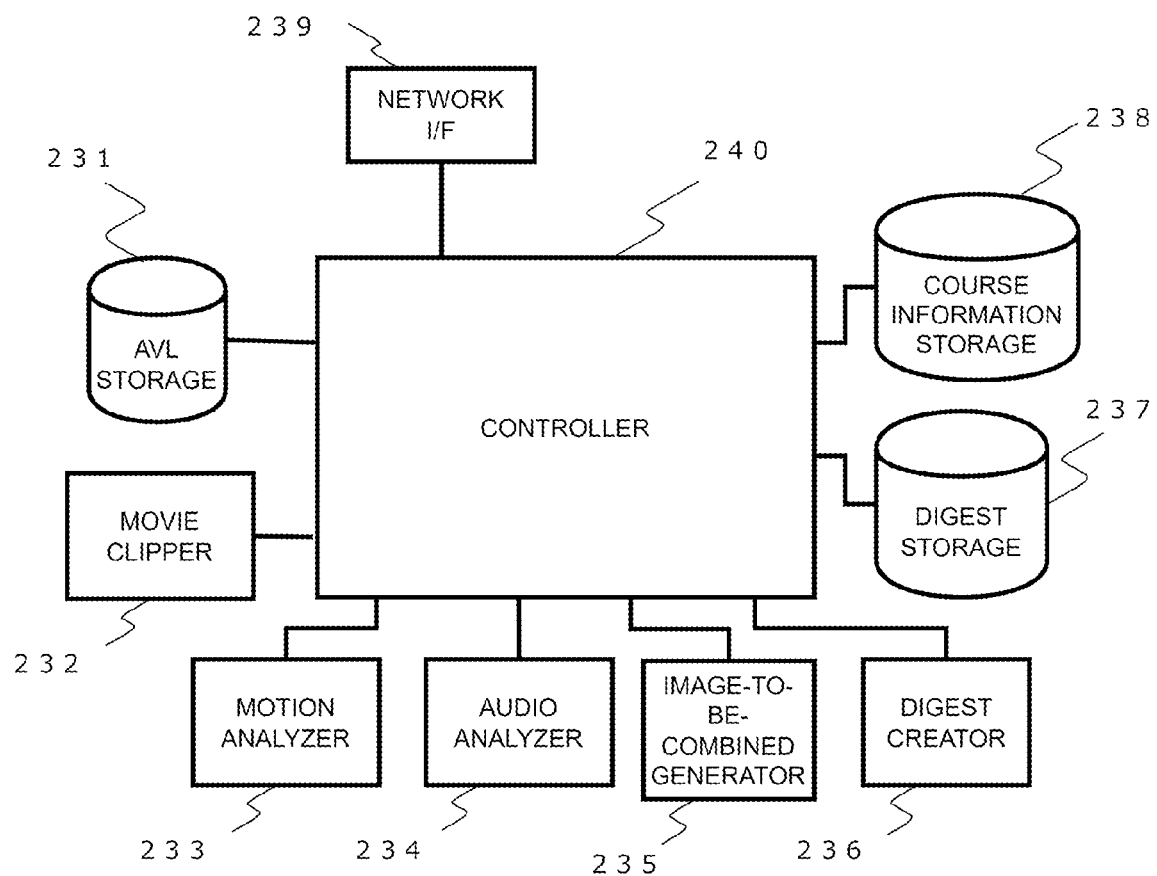
FIG. 5 is a diagram illustrating the hardware configuration of a digest creating device according to the first embodiment of the present invention.

FIG. 5 is a diagram illustrating the hardware configuration of the digest creating device 23 according to the present embodiment.

Referring to FIG. 5, the digest creating device 23 includes an AVL storage 231, a movie clipper 232, a motion analyzer 233, an audio analyzer 234, an image-to-be-combined generator 235, a digest creator 236, a digest storage 237, a course information storage 238, a network I/F 239, and a controller 240.

The AVL storage 231 is a nonvolatile storage device, and is a storage device that stores video data captured by the 360-degree camera (hereinafter referred to as "360-degree camera video data"), video data captured by the motorized-zoom-lens-equipped camera (hereinafter referred to as "optical zoom camera video data"), audio data, and movement trace data created by the mobile terminal 22, which have been received from the mobile imaging unit 21 via the fifth generation mobile communication system. A file of the movement trace data is accompanied by identification information of a player or a mobile terminal.

The movie clipper 232 designates a certain region in video data and clips an image. The movie clipper 232 detects persons by moving object detection, and clips the persons and the surrounding region thereof, or specifies and clips a person. To clip a specific person, a person tracking process is performed, and a region mainly including the person is clipped.

In a case where the area identification information accompanying optical zoom camera video data read from the AVL storage 231 indicates a green, the movie clipper 232 detects not only a person but also a pin and a ball on the green, and clips a region including them.

FIG. 7A illustrates an example image of a frame of video data captured by the 360-degree camera. The frame is a 360-degree image of a region around the golf cart. The movie clipper 232 clips the region surrounded by the broken line so as to include all the persons in the frame.

Figure 7B:
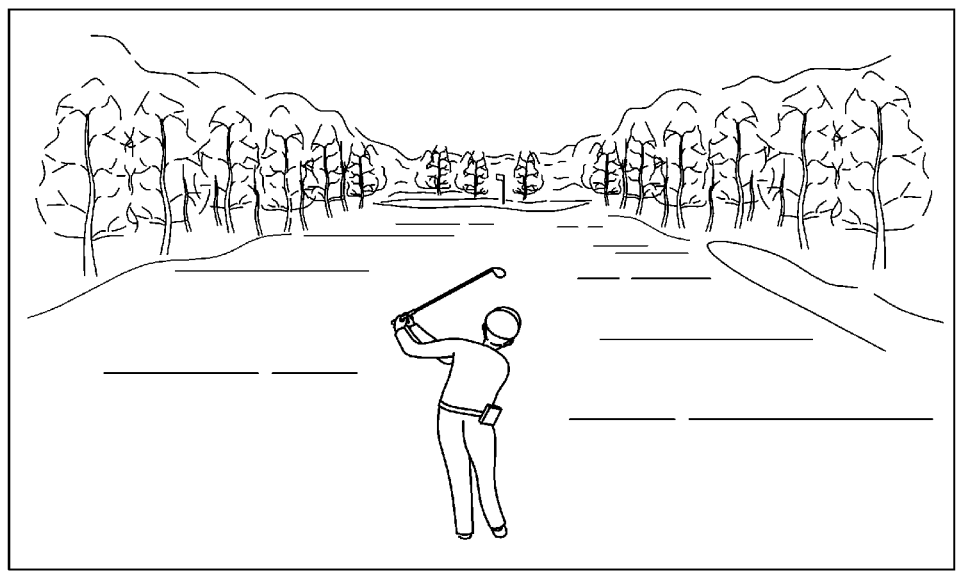
FIG. 7B is a diagram illustrating an example of a frame image obtained by mainly clipping a specific person from video data according to the first embodiment of the present invention.

FIG. 7B illustrates an example image obtained by specifying and clipping a person, in which a region is clipped such that the person has a predetermined size or more. At this time, to specify the person, information on the direction of the person as viewed from the 360-degree camera, for example, direction information such as minus 170 degrees, where the north is defined as 0 degrees, the clockwise direction is defined as plus, and the counterclockwise direction is defined as minus, is provided together with a movie clipping request. The clipped image is accompanied by the direction information, which serves as specification information specifying the person.

Figure 7C:
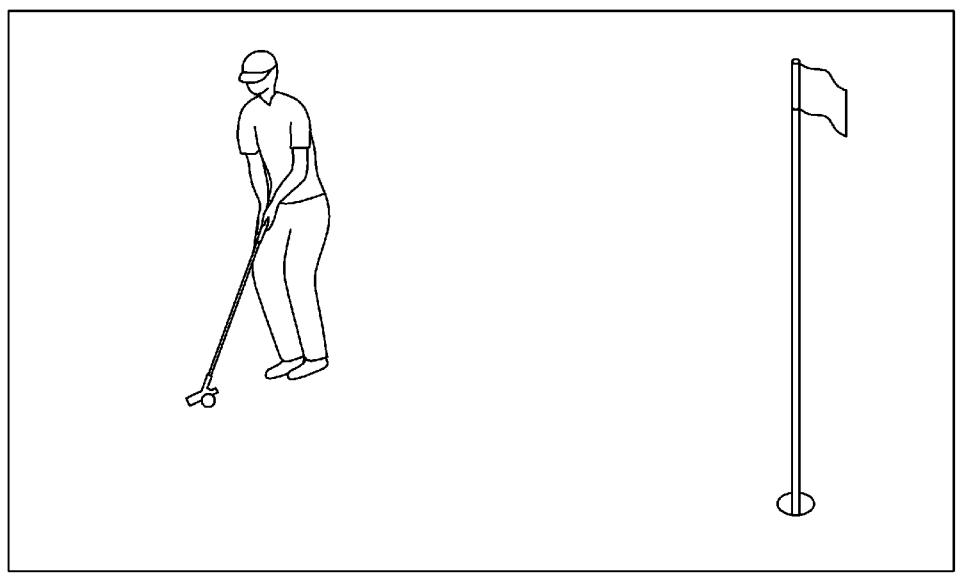
FIG. 7C is a diagram illustrating an example of a frame image obtained by mainly clipping a specific person and a pin on a green from video data according to the first embodiment of the present invention.

FIG. 7C illustrates an example image of a specified and clipped person on a green, in which a region mainly including the specified person and a pin is clipped.

These processes of detecting a person and so forth, tracking a person, and clipping (trimming) an image are performed by performing software processing using an image processing program, a motion analysis program, an object tracking program, a pattern recognition program, and so forth that are known and released in Open Source Computer Vision Library (OpenCV, developed and released by Intel Corporation).

The motion analyzer 233 performs image recognition on video data and analyzes whether a motion of a player is a swinging motion, a putting motion, a jumping motion, or a hand raising motion of the player. An example of the analysis technique is a known technique of determining a motion by using a cubic high order local auto correlation features. The motion analyzer 233 creates a highlight scene candidate list composed of the types of determined motions and the determination time information thereof.

In the present embodiment, an ultra-high-resolution camera is used. In the case of a 4K camera, a frame of a recorded movie has 3,840 pixels×2,160 pixels, and in the case of an 8K camera, a frame of recorded movie has 7,680 pixels×4,320 pixels. Thus, even a clipped image of a person has the number of pixels that is four times or eight times the number of pixels of a clipped image obtained in high definition (HD) image quality recording, and thus motion analysis can be performed with high accuracy. Furthermore, the video data from the second imaging unit 212 is a moving image in which only a green is enlarged by the motorized zoom lens, and thus a ball on the green can be clearly recognized.

The audio analyzer 234 performs frequency analysis on audio data to obtain a spectrogram, and calculates the degree of similarity with the spectrogram of a preset model. Furthermore, the audio analyzer 234 classifies audio information into a shot sound, a cheer, a laugh, a speaking voice, or other sounds by taking the mean square value of sound volume into account. In this way, the audio analyzer 234 creates a highlight scene candidate list composed of the types of determined sounds and time information.

The image-to-be-combined generator 235 generates an image to be combined and combines the image with video data. The image to be combined may be a plan-view hole image that is held in advance and that has a golf cart position or a highlight scene position marked thereon, or an image representing the undulations at a certain point using a solid model of a three-dimensional curved surface. The solid model is created by using a known solid modeling kernel.

Figure 10A:
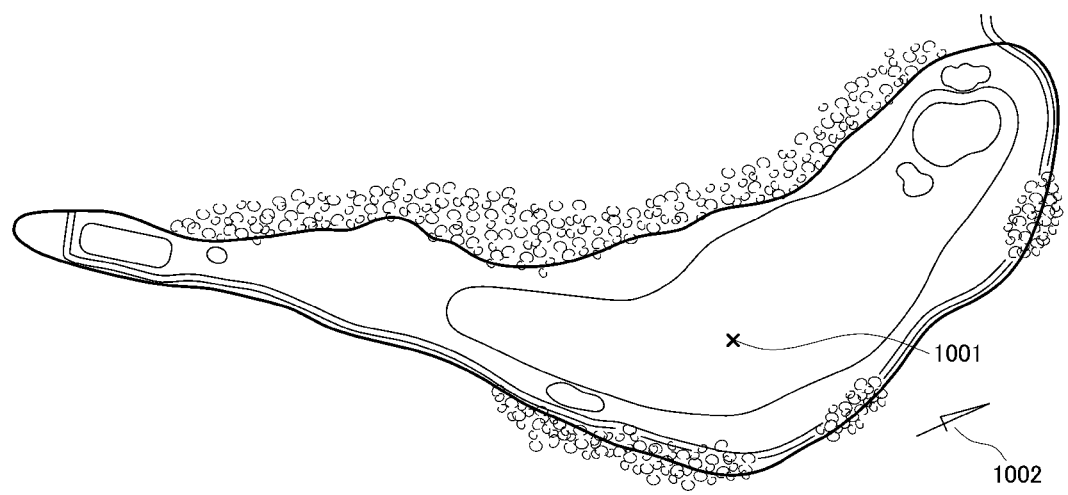
FIG. 10A is a diagram of a hole in a golf course to be combined with a digest video according to the first embodiment of the present invention.
Figure 10B:
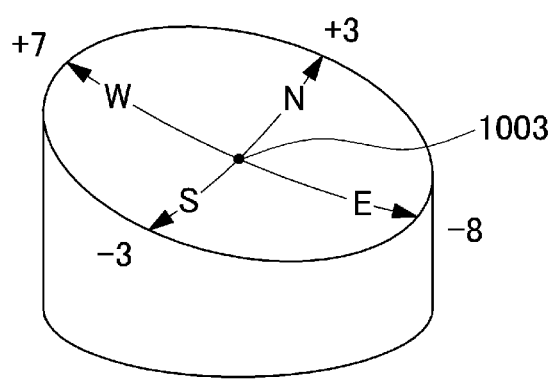
FIG. 10B is a diagram a solid model indicating undulations to be combined with a digest video.

FIG. 10A illustrates an example image of a plan view of a hole in a golf course to be combined with a digest video, and FIG. 10B illustrates an example image of a solid model indicating undulations to be combined with a digest video.

The digest creator 236 extracts highlight scenes from the video data and audio data stored in the AVL storage 231 on the basis of a time information list, and couples the highlight scenes to create a digest. In addition, the digest creator 236 corrects a frame clipped by the movie clipper 232 into full HD image quality by using a known up-conversion technique.

The digest storage 237 stores the digest created by the digest creator 236.

The course information storage 238 is a nonvolatile storage device and stores three-dimensional map information of all the holes of the golf course. The three-dimensional map information is composed of the latitudes, longitudes, and altitudes of individual points obtained by dividing a contour map of each hole of a golf course, which is created at an altitude interval of 1 cm, into a mesh of 5 cm square.

The controller 240 controls the digest creating device 23 as a whole, and instructs each processing unit constituting the digest creating device 23 to perform a request obtained via the network I/F 239.

The digest creating device 23 is a computer device including a mass storage device, and includes a CPU, a memory, a nonvolatile storage, an input/output interface, and a network interface, which are connected to each other via a bus. In particular, the functions of the movie clipper 232, the motion analyzer 233, the audio analyzer 234, the image-to-be-combined generator 235, the digest creator 236, and the controller 240 are implemented by loading various programs stored in the nonvolatile storage into the memory and executing the programs.

In the digest creating device according to the present invention, a digest creation AV storage corresponds to a part of the AVL storage 231 of the present embodiment, a map information storage corresponds to the course information storage 238 of the present embodiment, a data analyzer corresponds to the movie clipper 232, the motion analyzer 233, and the audio analyzer 234 of the present embodiment, and a digest creator corresponds to the image-to-be-combined generator 235 and the digest creator 236 of the present embodiment.

In addition, the golf digest creating system of the present embodiment includes the golf course terminal 24 and the digest distribution server 26. The golf course terminal 24 is a typical personal computer having a DVD writing function and a network I/F, and a digest providing service program is stored in the built-in storage device thereof. This application program is loaded from the built-in storage device into a memory and executed by a CPU, and thereby a digest providing service is implemented.

The digest distribution server 26 is a known streaming server that performs streaming distribution of a digest requested in HTTP live streaming (hereinafter referred to as HLS), a known web server that performs distribution by a hypertext transfer protocol (HTTP), or a known file server that performs file transfer by a file transfer protocol (FTP).

Figure 11:
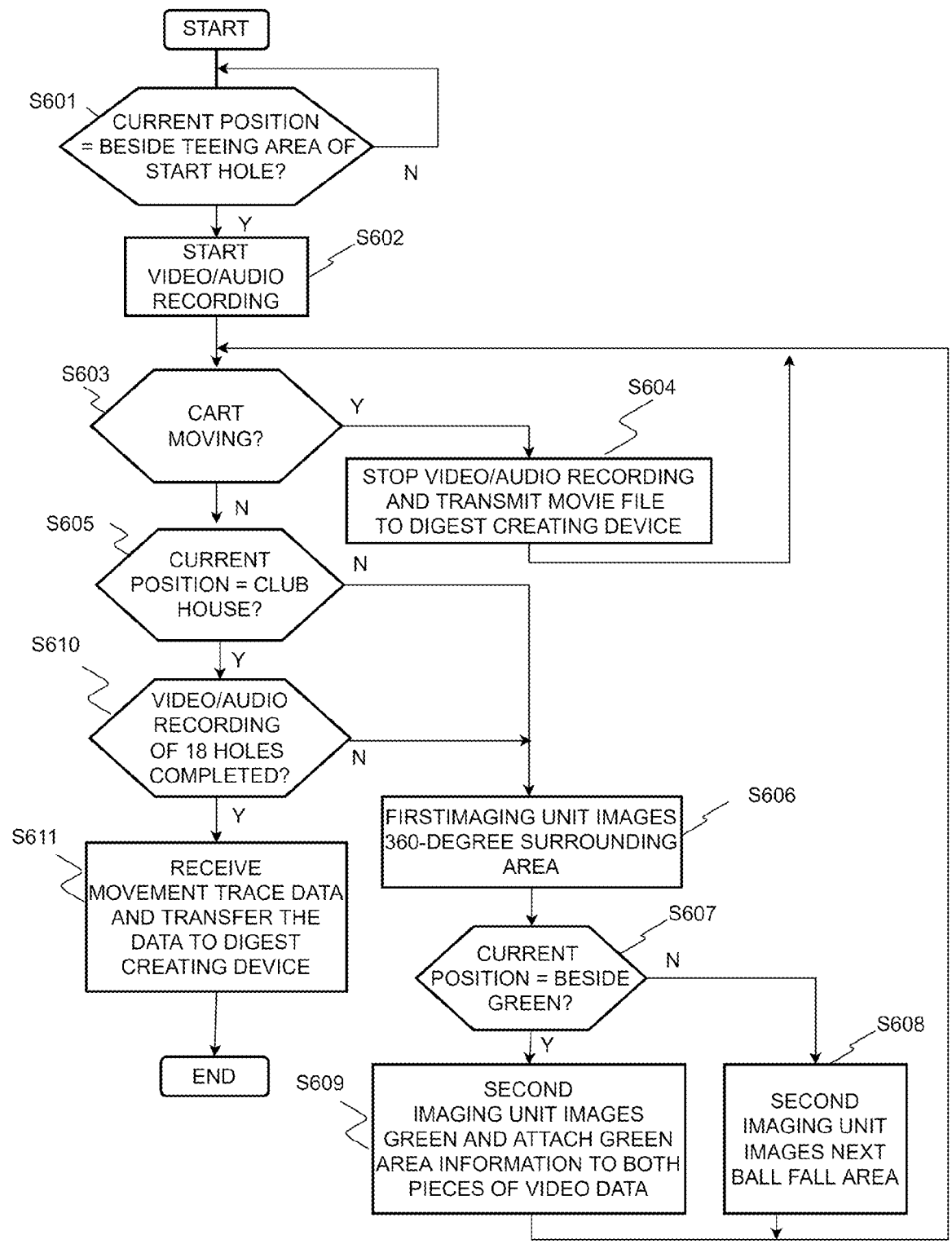
FIG. 11 is an operation flowchart of the mobile imaging unit according to the first embodiment of the present invention.

The operations and functions of the individual devices of the golf digest creating system having the above-described configuration will be described below. FIG. 11 is an operation flowchart of the mobile imaging unit 21.

Referring to FIG. 11, the controller 220 of the mobile imaging unit 21 determines whether the current position is beside a teeing area of a start hole (S601). If the controller 220 determines that the current position is beside a teeing area of a start hole, the controller 220 waits until position information becomes constant.

In response to detecting a stop beside the teeing area of the start hole, the controller 220 starts shooting and starts video/audio recording of movie data (S602). At this time, the controller 220 also records a golf cart number for identifying the movie data to be recorded, and a time at which video/audio recording of movie data starts. Thereafter, the controller 220 of the mobile imaging unit 21 records an elapsed time from the start of recording (time code), a hole number of the hole where the golf cart is stopped, position information (latitude and longitude information), and area identification information by attaching them to video data.

Subsequently, the controller 220 determines whether the position information has changed (S603), and waits until the position information has changed.

If the position information has changed, because the golf cart is moving, the controller 220 stops video/audio recording of movie data, and closes the movie data file that is being recorded in the first AV storage 214 and the second AV storage 215. Subsequently, the controller 220 transmits the movie data file from the 5G wireless transmitter/receiver 217 to the digest creating device 23 on the Internet by the FTP (S604). The movie data file is accompanied by a golf course number, a play date, a cart number, identification information indicating the 360-degree camera or the motorized-zoom-lens-equipped camera used for shooting, and a movie identifier (ID) serving as a file name and composed of a serial number which is incremented every time a movie data file is transmitted.

Thereafter, if the controller 220 determines that the position information has not changed, the controller 220 determines whether the current position is the club house (S605). If the current position is not the club house, the controller 220 starts imaging by the first imaging unit 211 and video/audio recording (S606).

Subsequently, the controller 220 determines whether the current position is beside a green (S607). If the current position is not beside a green, the controller 220 controls the second imaging unit 212 to image an area assumed to be a next ball fall area, and performs video/audio recording (S608).

Specifically, referring to FIG. 8, when the current position is in area 1, the controller 220 determines an angle of view and a direction by using the three-dimensional map information stored in the course information storage 216 so that the entire next area 2 is included in the screen. Subsequently, the controller 220 changes the zoom magnification of the motorized-zoom-lens-equipped camera of the second imaging unit 212 by driving the lens moving motor, and controls the pan driving motor and the tilt driving motor so that the detection values of the azimuth sensor 62 and the inclination sensor 63 of the motorized camera platform 60 match the determined azimuth and elevation angle. Here, "the entire next area is included from the current position" means that, for example, the angle of view is set to a maximum angle of view 804 at which the entire area 2 can be shot when the golf cart is at point G1 (801) beside the teeing area, and that the angle of view is set to a maximum angle of view 808 at which the entire area 3 can be shot when the current position is at point G3 (805).

On the other hand, if the current position is beside the green, the controller 220 of the mobile imaging unit 21 controls the second imaging unit 212 to image the entire green from the current position and performs video/audio recording (S609).

That is, referring to FIG. 8, when the current position is point G4 (809), the controller 220 determines the angle of view of the motorized-zoom-lens-equipped camera of the second imaging unit 212 to a maximum angle of view 810 so that the entire green 811 is within the screen, and simultaneously determines a direction. Subsequently, the controller 220 changes the zoom magnification of the motorized-zoom-lens-equipped camera of the second imaging unit 212 by driving the lens moving motor, and starts shooting by controlling the pan driving motor and the tilt driving motor of the motorized camera platform 60.

If the controller 220 of the mobile imaging unit 21 determines in step S605 that the current position is the club house, the controller 220 determines whether the play of all the 18 holes has been recorded (step S610). If not, the process proceeds to step S606.

On the other hand, if the play of all the 18 holes has been recorded, the controller 220 of the mobile imaging unit 21 determines that the round has finished, and requests the individual mobile terminals 22 to transmit movement trace data. In response to receiving movement trace data files from the individual mobile terminals 22 via the wireless transmitter/receiver 218, the controller 220 transfers the movement trace data files from the 5G wireless transmitter/receiver 217 to the digest creating device 23 on the Internet by the FTP (S611). Each movement trace data file is accompanied by identification information of the player or the mobile terminal.

Furthermore, if the transmission of the movie data to the digest creating device 23 has been completed, the controller 220 of the mobile imaging unit 21 notifies the digest creating device 23 that the last file has been transmitted. If the transmission has not been completed, the controller 220 transmits not-yet-transmitted movie data and then provides a notification indicating that the last file has been transmitted.

Figure 12:
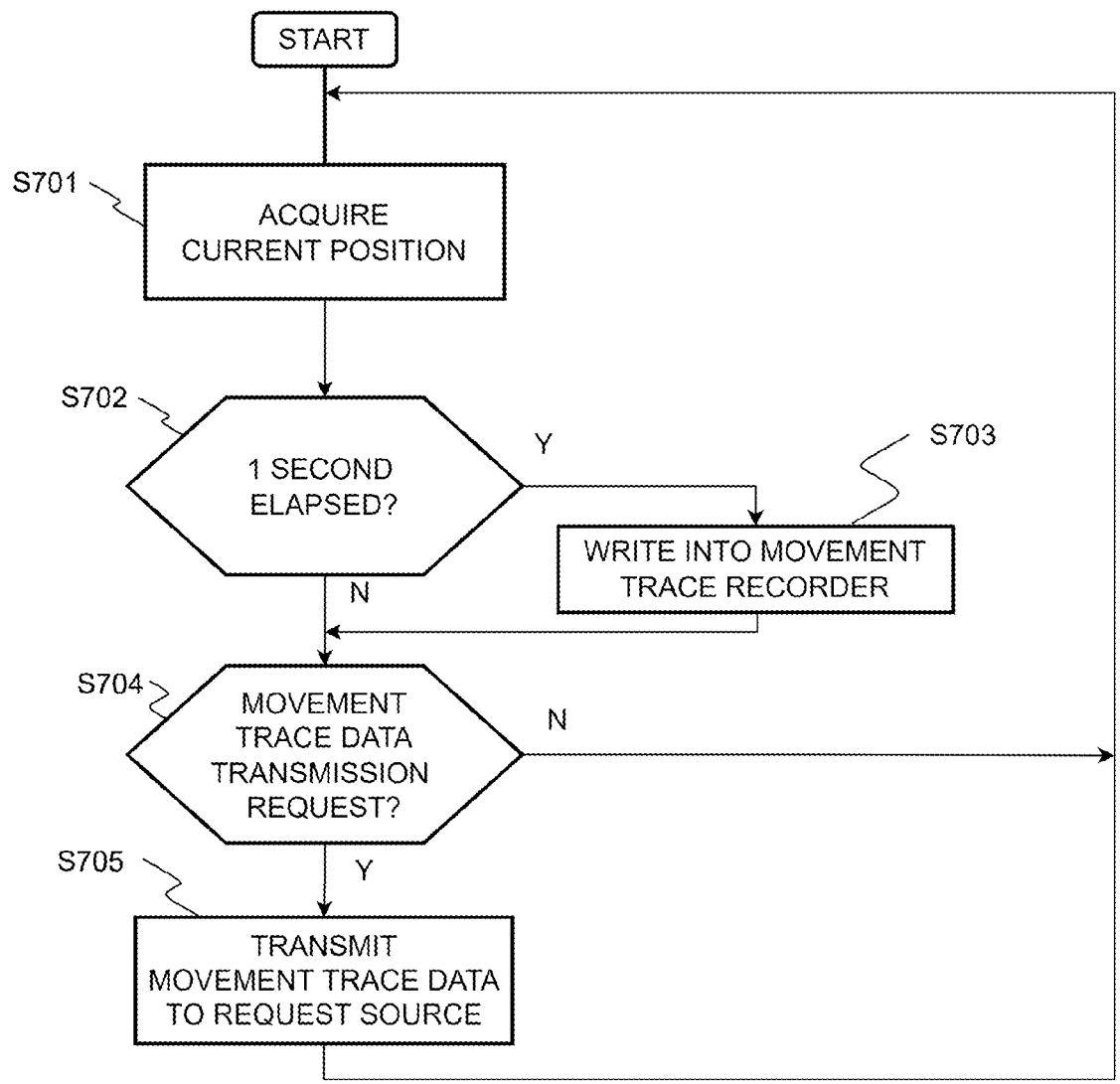
FIG. 12 is an operation flowchart of the mobile terminal according to the first embodiment of the present invention.

The above is the operation flow of the mobile imaging unit 21. In this way, the mobile imaging unit 21 automatically starts and ends recording of movie data by detecting a current position. This makes it possible to prevent recording from being forgotten or being performed insufficiently. Next, the operation and function of the mobile terminal 22 will be described with reference to the drawings. FIG. 12 is an operation flowchart of the mobile terminal 22.

Referring to FIG. 12, the controller 224 of the mobile terminal 22 acquires position information from the GPS receiver 221 (S701), and determines whether a predetermined time has elapsed from the previous recording of position information (S702). In the present embodiment, the predetermined time is one second.

If the predetermined time has elapsed, the controller 224 additionally writes the acquired position information together with time information into the movement trace recorder 222 (S703). If the predetermined time has not elapsed, the position information is not written.

Subsequently, the controller 224 determines whether a movement trace data transmission request has been received (S704). If the transmission request has been received, the controller 224 transmits the movement trace data written in the movement trace recorder 222 and identification information of the player or mobile terminal to the request source via the wireless transmitter/receiver 223 (S705), and then the process returns to step S701.

On the other hand, if the transmission request has not been received, the process returns to step S701. The above is the operation and function of the mobile terminal 22.

Next, the operation and function of the digest creating device 23 will be described with reference to the drawings.

Figure 13:
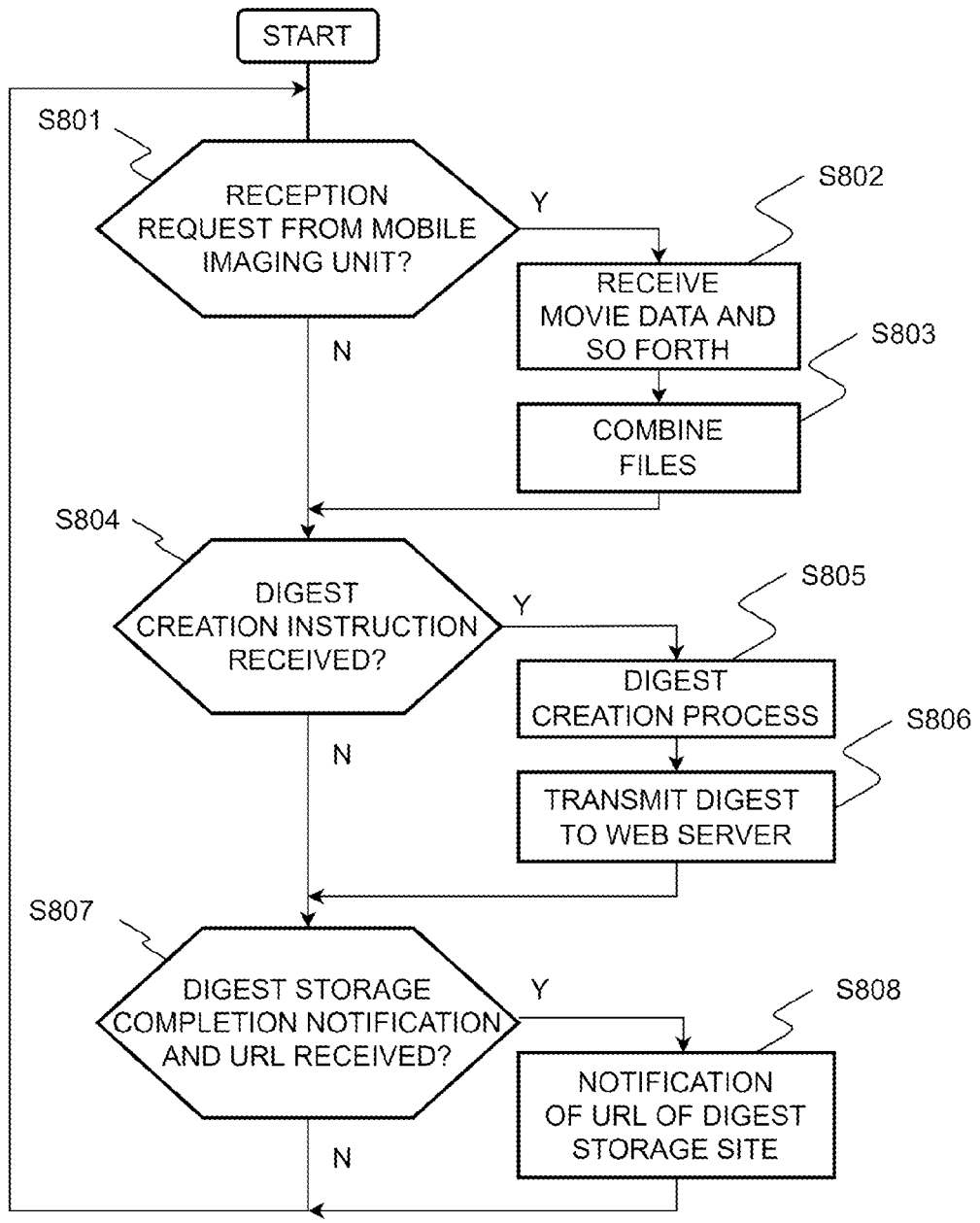
FIG. 13 is an operation flowchart of the digest creating device according to the first embodiment of the present invention.

FIG. 13 is an operation flowchart of the digest creating device 23.

Referring to FIG. 13, the controller 240 of the digest creating device 23 determines whether there is a movie data reception request from the mobile imaging unit 21 (S801). If there is the reception request, the controller 240 permits transmission, and receives a video data file and an audio data file accompanied by a movie ID by the FTP (S802). Subsequently, the controller 240 writes the files into the AVL storage 231, and combines the files with the respective files having the same movie ID received so far (S803). The reception of the video data file and so forth and the combining of the files are performed until a last file transmission completion notification is received from the mobile imaging unit 21.

Subsequently, in response to receiving a digest creation instruction from the golf course terminal 24 (S804), the controller 240 of the digest creating device 23 performs a digest creation process (S805).

Figure 14:
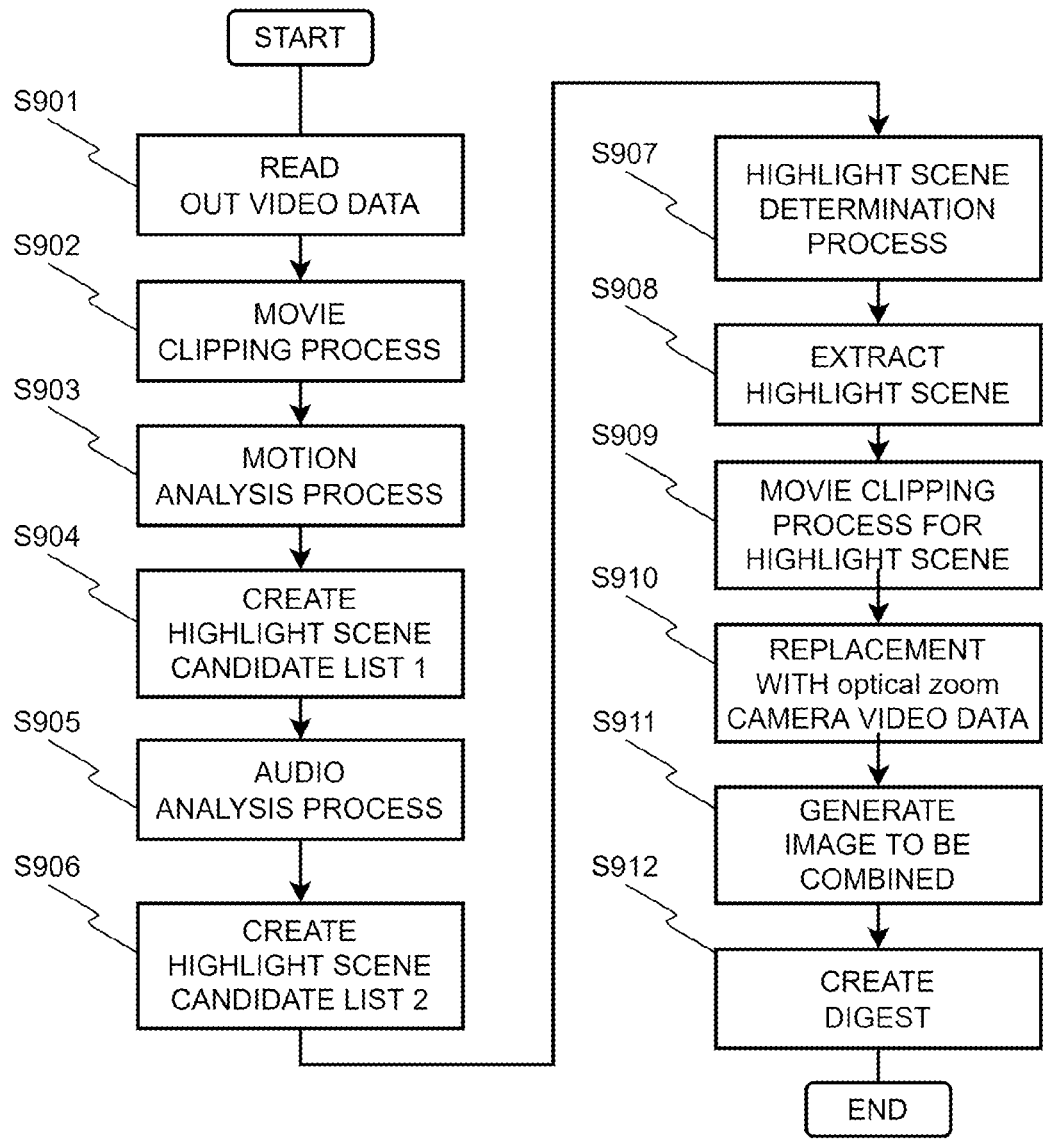
FIG. 14 is an operation flowchart describing a digest creation process performed by the digest creating device according to the first embodiment of the present invention.

FIG. 14 is an operation flowchart describing a digest creation process.

Referring to FIG. 14, the controller 240 of the digest creating device 23 reads out, on the basis of a golf course number, a play date, and a golf cart number attached to the digest creation instruction, a 360-degree camera video data file having the golf cart number from the AVL storage 231 by referring to the movie ID (S901). Subsequently, the controller 240 requests the movie clipper 232 to perform a movie clipping process on video data whose area identification information is not a green in the video data. In addition, the controller 240 reads out an optical zoom camera video data file having the golf cart number by referring to the movie ID, and requests a movie clipping process for video data whose area identification information is a green.

In response to these requests, the movie clipper 232 performs a person detection process to clip a region including a portion recognized as a person, and clips a region including a portion recognized as a person and a portion recognized as a pin from the video data whose area identification information is a green (S902).

Subsequently, the controller 240 of the digest creating device 23 requests the motion analyzer 233 to perform a motion analysis process on the clipped movie. In response to the request, the motion analyzer 233 performs a motion analysis process (S903), and creates a highlight scene candidate list 1 including motion types and the occurrence time information thereof (S904). Even if the video data has a high resolution, motion analysis is performed on a part of the video data obtained from clipping, and thus the analysis time can be shortened.

Subsequently, the controller 240 requests the audio analyzer 234 to perform an audio analysis process on the audio data read out from the AVL storage 231. The audio analyzer 234 performs an audio analysis process (S905) and creates a highlight scene candidate list 2 including sound types and the determination time information thereof (S906).

Subsequently, the controller 240 of the digest creating device 23 determines a scene to be extracted as a highlight scene from the lists created by the motion analyzer 233 and the audio analyzer 234 (S907).

FIG. 15 is an operation flowchart describing a highlight scene determination process.

Referring to FIG. 15, the controller 240 of the digest creating device 23 creates a candidate list by combining the highlight scene candidate list 1 and the highlight scene candidate list 2 in chronological order (S1001), and assigns evaluation values to the individual motion types and sound types (S1002).

FIG. 16A and FIG. 16B are diagrams describing a process of assigning evaluation values to motion types and sound types.

A criterion of assigning evaluation values is as follows: for example, an evaluation value of 6 is assigned in a case where the motion type is swinging or putting, and an evaluation value of 4 is assigned in a case where the motion type is jumping or hand raising. An evaluation value of 6 is assigned in a case where the sound type is shot sound, an evaluation value of 4 is assigned in a case where the sound type is cheer, and an evaluation value of 3 is assigned in a case where the sound type is laugh. In particular, in a case where the sound is determined to be a speaking voice and where the voice recognized by a known voice recognition process is "great shot" or "good shot", an evaluation value of 6 is assigned because the scene is a strong candidate for a highlight scene. In a case where the sound is determined to be another type of voice, an evaluation value of 0 is assigned.

First, the controller 240 assigns evaluation values to the individual motion types and sound types in accordance with the foregoing criterion, as illustrated in FIG. 16A.

Subsequently, the controller 240 adds an evaluation value in accordance with the positional relationship with the golf cart (S1003). For example, if the swinging and the shot sound are generated on the teeing ground, an evaluation value of 4 is added to each of them. In addition, as illustrated in FIG. 16B, an evaluation value of 4 is added to putting on the green. Accordingly, it is possible to prevent a tee shot and a motion of putting a ball into a cup from not being regarded as a highlight scene.

In the stage of assigning evaluation values, to specify a target person in video for which a motion type is determined in a movie re-clipping process, specification information in video of the person, for example, information on the direction from the golf cart in the present embodiment, is recorded.

Subsequently, as illustrated in FIG. 16A and FIG. 16B, the controller 240 sets a predetermined period before and after a motion or sound of one motion type or sound type as one section, and calculates the sum of evaluation values in the section as a section evaluation value (S1004). For example, for the motion type of swinging or putting, a period from 5 seconds before the motion to 5 seconds after the motion is regarded as one section. For a cheer, jumping, or hand raising, a period from 5 seconds before the motion or sound to 1 second after the motion or sound is regarded as one section. In a case where sections overlap each other, the sections are combined into one section. For example, in FIG. 16A, the period from 5 seconds before the motion type "swinging" to 1 second after the motion type "jumping" is regarded as one section. In FIG. 16B, the period from 5 seconds before the motion type "putting" to 1 second after the motion type "hand raising" is regarded as one section.

Accordingly, in a case where events are detected in one section by both motion analysis and audio analysis, the section evaluation value is high, and the probability of being extracted as a highlight scene increases. Thus, the validity of selecting a highlight scene increases.

Subsequently, the controller 240 determines a section to be selected as a highlight scene, which is a section having a section evaluation value larger than or equal to a predetermined value (S1005). The above is the highlight scene determination process (S907).

Subsequently, the controller 240 of the digest creating device 23 extracts movie data of the selected section from the movie data that is stored in the AVL storage 231 and that has not been subjected to a movie clipping process (S908), and requests the movie clipper 232 to perform a movie clipping process again. In response to the request, the movie clipper 232 performs clipping from the video data of the section selected as a highlight scene. At this time, if specification information of a person to be specified, information on the direction from the golf cart in the present embodiment, is recorded in the selected section, the movie clipper 232 performs a clipping process so that the specified person is centered as illustrated in FIG. 7B or that the specified person and the pin are centered as illustrated in FIG. 7C. In a case where the person is moving within the period of time of the selected section, the movie clipper 232 tracks the person and performs a clipping process such that the person is included in the frame (S909).

Subsequently, in a case where the clipped movie data includes a shot sound, the controller 240 extracts, from the video data shotted by the optical zoom camera, movie data corresponding to the time at which the shot sound occurred or a predetermined period after one second from the occurrence, and replaces the 360-degree camera video data with the extracted movie data. In a case where, after the shot sound has occurred, a motion is detected in the same section, the 360-degree camera video data is replaced with the optical zoom camera video data corresponding to the time until the motion (S910).

This makes it possible to visually recognize the movement of the hit ball after the shot, which is a highlight scene, in a digest video.

Subsequently, the controller 240 of the digest creating device 23 requests the image-to-be-combined generator 235 to generate an image to be combined with the clipped movie and to create video data by combining the image (S911). Hereinafter, the process performed by the image-to-be-combined generator 235 will be described in detail.

First, the image-to-be-combined generator 235 determines whether the video data of the highlight scene is accompanied by specification information of the person to be specified (in the present embodiment, information on the direction from the golf cart). If the specification information is attached, the image-to-be-combined generator 235 obtains position information of the person to be specified by using time information indicating the time at which the highlight scene occurred, position information of the golf cart, the direction information, and movement trace data, puts a mark on a plan view image, and combines the image with the video data.

FIG. 10A is a plan view of a hole in a golf course to be combined with a digest video. A mark 1001 indicates the position where the highlight scene occurred, and a azimuth mark 1002 indicates azimuths.

Now, a description will be given of a method for accurately determining the position at which a person to be specified presents when a highlight scene occurs, with reference to FIG. 9.

Figure 9:
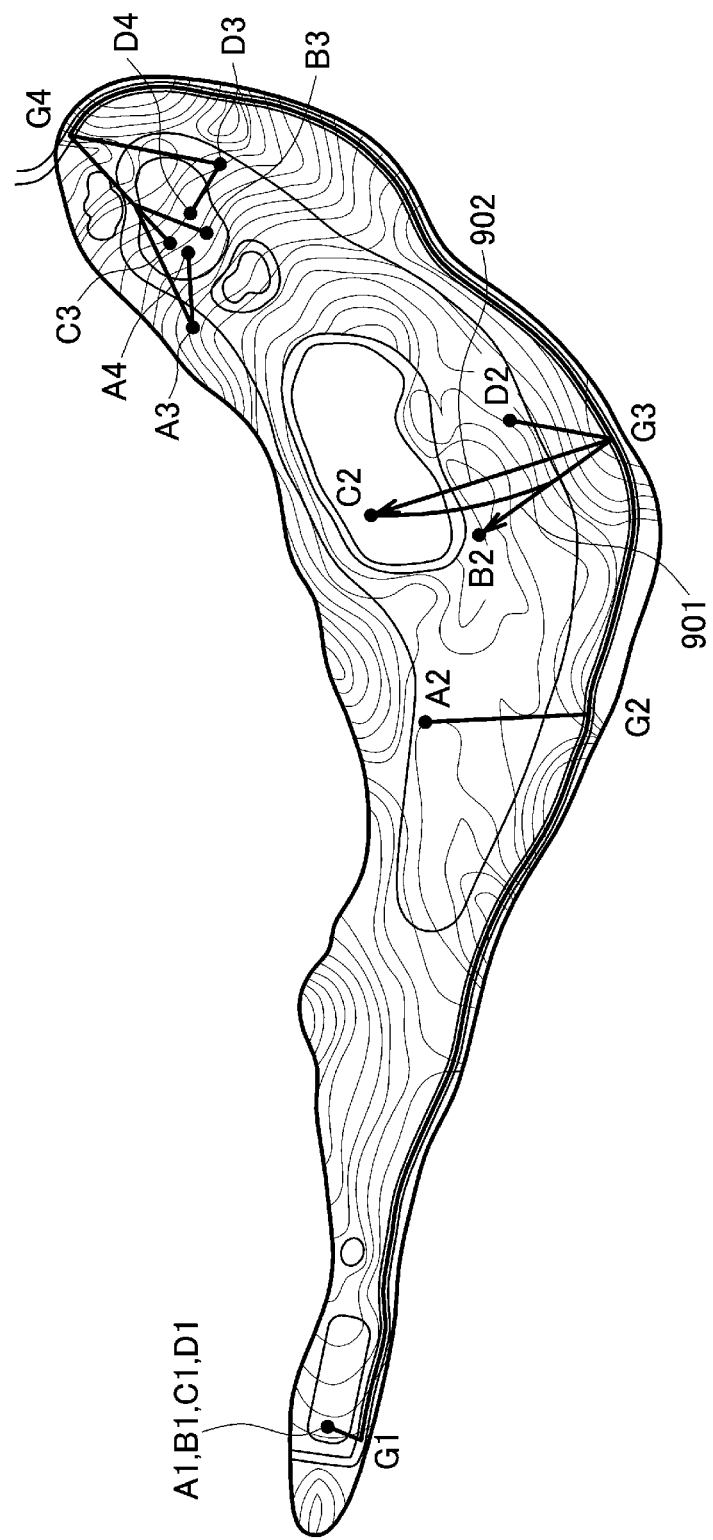
FIG. 9 is a diagram describing a method for accurately obtaining a position where a person to be specified is present when a highlight scene occurs according to the first embodiment of the present invention.

Referring to FIG. 9, A1 to A4 indicate positions at which player A played. Similarly, B1 to B3 indicate positions at which player B played, C1 to C3 indicate positions at which player C played, and D1 to D4 indicate positions at which player D played. G1 to G4 indicate positions at which the golf cart stopped.

The line connecting G1, A1, G1, G2, A2, G2, G3, G4, A3, and A4 indicates the movement trace of player A. Similarly, the line connecting G1, B1, G1, G2, G3, B2, G3, G4, and B3 indicates the movement trace of player B, the line connecting G1, C1, G1, G2, G3, C2, G3, G4, and C3 indicates the movement trace of player C, and the line connecting G1, D1, G1, G2, G3, D2, G3, G4, D3, and D4 indicates the movement trace of player D.

Assume that the play of player B and player C at respective positions B2 and C2 is a highlight scene. In this case, because direction information 901 (specification information) of player B and direction information 902 (specification information) of player C, which indicate directions from the golf cart when the highlight scene occurs, are given to video data, these pieces of specification information are compared with directions calculated from position information B2 of player B, position information C2 of player C, and position information G3 of the golf cart at the time of the occurrence obtained from movement trace data. Then, the position information of the player in the direction closest to the specification information is regarded as the position information of the person to be specified in the highlight scene. Accordingly, the position information of the specific person can be accurately determined.

Subsequently, the image-to-be-combined generator 235 extracts, from the position information of the specified person and the three-dimensional map information stored in the course information storage 238, data of the latitude, longitude, and altitude in the range of a 1-meter radius around the point at which the highlight scene occurred. The image-to-be-combined generator 235 then creates, from the data, an image of a solid model of a three-dimensional curved surface having azimuth information (N, S, E, W).

FIG. 10B is a diagram of a solid model indicating undulations to be combined with a digest video, which is created for the range of a 1-meter radius around a position 1003 at which the highlight scene occurred. In FIG. 10B, N, E, S, and W indicate azimuths, and the numbers indicate the differences in altitude between the center and the respective positions in centimeters. The figure of the solid model corresponds to topographic information generated by the digest creating device according to the present invention.

Subsequently, the image-to-be-combined generator 235 combines the image of the solid model and the marked map image with the video data.

Accordingly, the position at which the highlight scene occurred and the undulation shape of the place are also displayed in the digest video, and thus the player is able to know the undulation in which he/she hit the ball after play. That is, in FIG. 10A, the green is in the direction of northwest from the shot position indicated by the mark 1001, and it can be seen from FIG. 10B that the target player, if he/she is right-handed, has hit the ball below feet in an uphill stance.

On the other hand, if the video data of the highlight scene is not accompanied by specification information of the person to be specified, a mark (for example, a white circle) indicating the position of the golf cart is attached to the above-described plan-view image of the hole on the basis of the position information of the golf cart. Thereafter, the plan-view image is combined with the video data.

The above is the image-to-be-combined generation process (S911) performed by the image-to-be-combined generator 235.

Subsequently, the controller 240 of the digest creating device 23 requests the digest creator 236 to create a digest. In response to the request, the digest creator 236 couples pieces of movie data synthesized with the map image and the solid model image showing undulations in chronological order, while correcting the quality of the movie data to full HD image quality by an up-conversion technique, and sequentially writes the frames of movie data into the digest storage 237.

Finally, the controller 240 refers to the hole number recorded on the video data together with time information, and inserts a prepared image indicating the hole number before the movie of the tee shot (S912).

The above is the digest creation process (S805) performed by the digest creating device 23. After that, the created digest is given a digest ID and is transmitted to the digest distribution server 26 (web server) (S806). The digest ID is composed of a golf course number, a play date, and a cart number.

Subsequently, in response to receiving a digest file storage completion notification and the URL of a storage site from the digest distribution server 26 (S807), the controller 240 of the digest creating device 23 notifies the golf course terminal 24 of the URL of the storage site and the digest ID in association with each other (S808).

Thereafter, the controller 240 of the digest creating device 23 returns to step S801.

The above is the operation flow of the digest creating device 23 according to the present embodiment.

Next, the operation flow of the digest distribution server 26 will be described.

Figure 17:
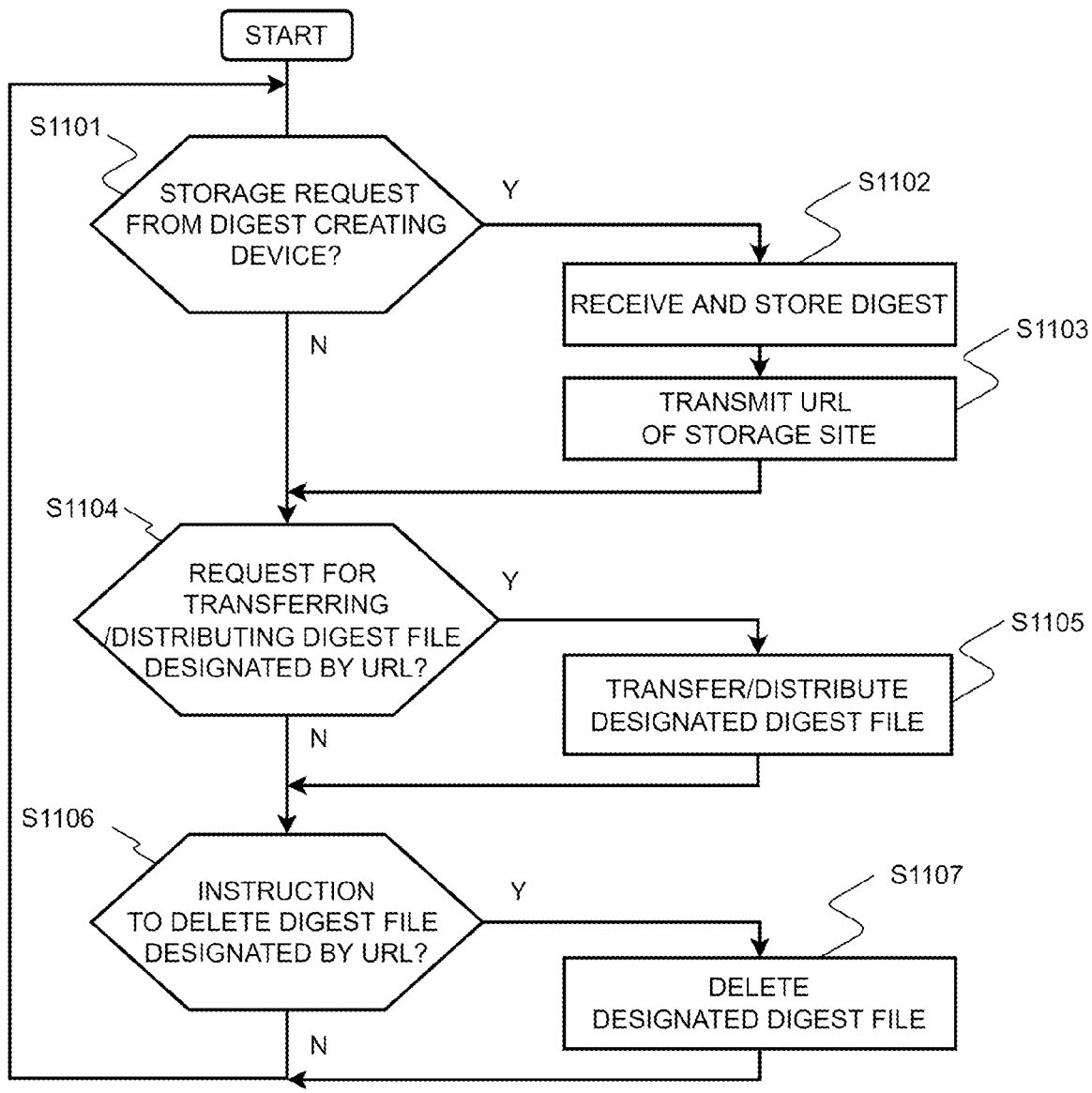
FIG. 17 is an operation flowchart of a digest distribution server according to the first embodiment of the present invention.

FIG. 17 is an operation flowchart of the digest distribution server 26.

As described above, the digest distribution server 26 is a web server that performs, on the Internet, file transfer and streaming distribution of digests (movie files) managed by the digest distribution server 26.

First, in response to receiving a storage request from the digest creating device 23 (S1101), the digest distribution server 26 receives a digest file having a digest ID as a file name, and stores the digest file in a storage device (S1102). The digest distribution server 26 then transmits the URL of the storage site of the digest file to the digest creating device 23 (S1103). At this time, the digest distribution server 26 manages the digest ID, which is the file name of the received file, and the URL of the storage site in association with each other.

Subsequently, in response to receiving a transfer request or a streaming distribution request for a digest file designated by a URL from the mobile terminal of a player or the like or the golf course terminal 24 (S1104), the digest distribution server 26 reads out the designated digest file from the storage device, and transmits the digest file to the terminal of the request source by file transfer using the FTP or streaming distribution using the HLS protocol (S1105).

Subsequently, in response to receiving an instruction to delete a digest file designated by a URL from the mobile terminal of a player or the like or the golf course terminal 24 (S1106), the digest distribution server 26 deletes the designated digest file from the storage device and notifies the player terminal or the golf course terminal 24 of the transmission source that the digest file has been deleted (S1107). The above is the operation flow of the digest distribution server 26.

Figure 18:
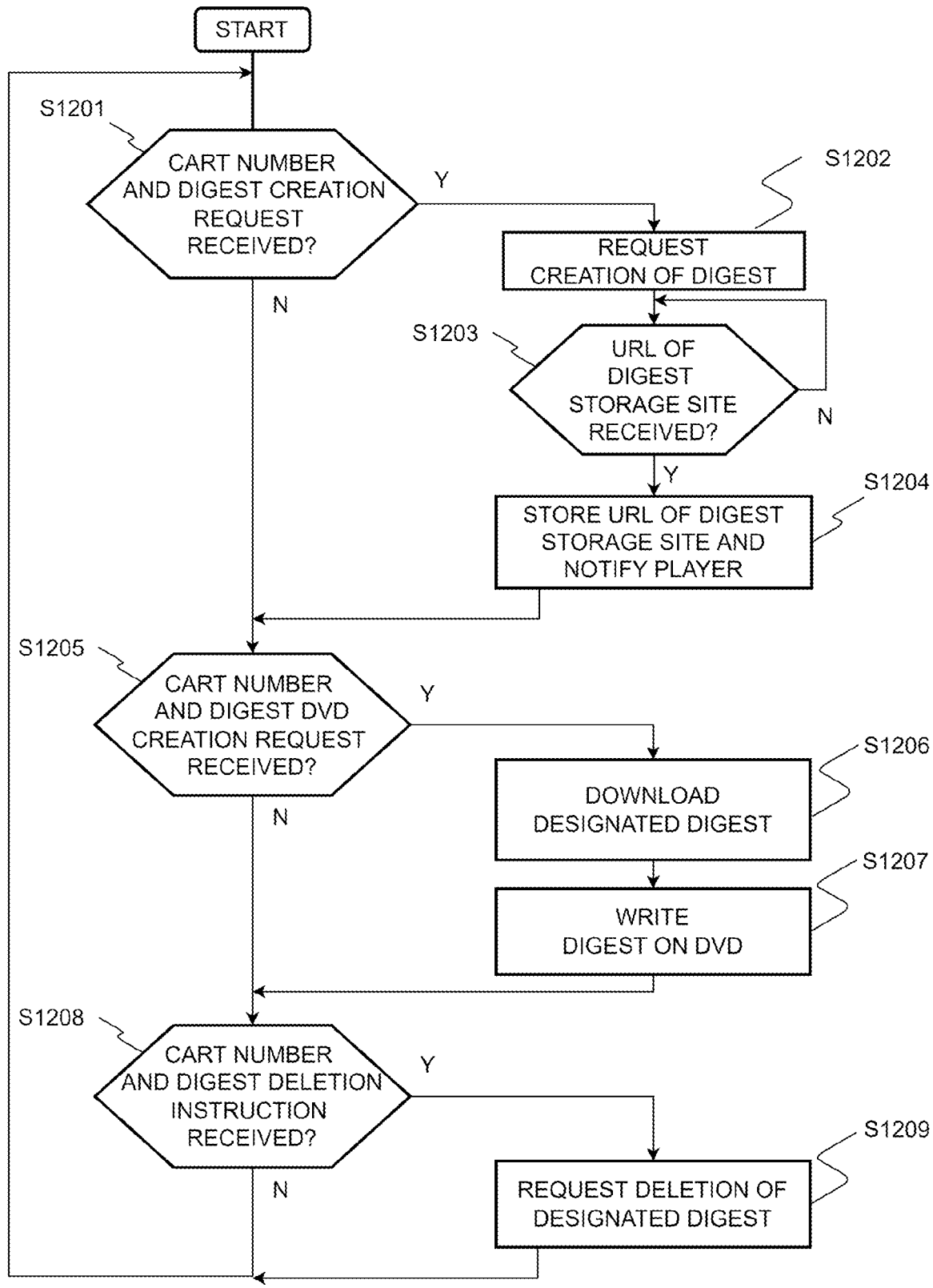
FIG. 18 is an operation flowchart of a golf course terminal according to the first embodiment of the present invention.

Next, the operation of the golf course terminal 24 will be described. FIG. 18 is an operation flowchart of the golf course terminal 24. As described above, the golf course terminal 24 is a typical personal computer capable of connecting to the Internet, and executes a digest providing service program. That is, first, a menu including a digest creation request, a DVD creation request, and a digest deletion request is displayed on the display.

In response to receiving a digest creation request after input of a golf cart number from a keyboard or the like (S1201), the golf course terminal 24 requests the digest creating device 23 to create a digest from the file of the corresponding video data or the like by adding a golf course number, a play date, and a golf cart number (S1202). The request is sent to the digest creating device 23 on the Internet via the network I/F included in the golf course terminal 24.

Thereafter, the golf course terminal 24 determines whether a digest ID and a URL indicating the storage site of the digest have been received from the digest creating device 23 (S1203), and repeats checking until a digest ID and a URL have been received.

Thereafter, in response to receiving a digest ID and a URL from the digest creating device 23, the golf course terminal 24 stores the URL and the digest ID in association with each other, and notifies the player who played with the cart number indicated by the digest ID of the URL by email or the like (S1204).

The player who has received the email accesses the URL from his/her mobile terminal and makes a digest transfer request. Accordingly, the digest distribution server 26 transmits the digest to the mobile terminal of the request source by file transfer or streaming distribution, and thus the player is able to view the digest.

In response to receiving a request for creating a DVD from a player (S1205), the golf course terminal 24 obtains a digest ID from a play date, a golf course ID, and a designated cart number, and extracts a URL from related information of URLs and digest IDs received from the digest creating device 23. The golf course terminal 24 then accesses the URL, downloads the digest file from the digest distribution sever 26 (S1206), and writes the digest file onto a DVD (S1207). At this time, the golf course terminal 24 creates the DVD of the digest with full HD (1,920 pixels× 1,080 pixels) image quality.

Subsequently, in response to receiving a cart number and a digest deletion instruction from the display menu (S1208), the golf course terminal 24 extracts the corresponding URL and transmits a digest file deletion request to the digest distribution sever 26 (S1209).

In response to the request, the digest distribution server 26 deletes the digest file having the designated URL as an address.

As described above, in the present embodiment, the golf digest creating system includes a motorized-zoom-lens-equipped camera in addition to an ultra-high resolution 360-degree camera disposed at a position in an upper part of a golf cart, the position having a view of 360 degrees. Thus, play in a place away from the golf cart can also be imaged in a magnified state, and thus rolling of a ball on a green and falling of a ball after a shot can be recorded in a digest video in a clearly visible level.

In the present embodiment, each player plays a round while carrying a mobile terminal that records movement trace information, and thus the position of a person in a highlight scene can be accurately obtained. This makes it possible to know the undulation in which the player hit the ball.

In the present embodiment, a player does not need to perform any input to the mobile terminal 22 or the mobile imaging unit 21. Thus, the player is able to enjoy golf without being concerned about video shooting.

In the present embodiment, the first AV storage 214 and the second AV storage 215 are provided in the mobile imaging unit 21, and the movie data from the first imaging unit 211 and the second imaging unit 212 is written therein. However, the present invention is not limited thereto. Movie data may be output from the 5G wireless transmitter/receiver 217 and transmitted to the digest creating device 23 in real time.

In this case, it is preferable to provide a real-time encoder that compresses the movie data from the first imaging unit 211 and the second imaging unit 212 by a video compression scheme H.265/HEVC or the like, and transmit the encoded movie data. Even in the case of transmitting movie data in real time, it is preferable that the first AV storage 214 and the second AV storage 215 store a certain amount of movie data in order to cope with a communication trouble in a mobile communication system.

In the present embodiment, the mobile terminal 22 records movement trace data in the movement trace recorder 222 from the start to end of a round, and transmits the movement trace data to the mobile imaging unit 21 after the round has finished. However, the present invention is not limited thereto. The mobile terminal 22 may transmit movement trace data at a predetermined time interval, for example, at an interval of 1 second in the present embodiment, to the mobile imaging unit 21, and the mobile imaging unit 21 may include a movement trace recorder. With this configuration, the mobile terminal 22 does not need to record movement trace data, and is able to have a simple hardware configuration including a GPS receiver.

Furthermore, the mobile terminal 22 may include a microphone and transmit audio data to the mobile imaging unit 21 in real time via the wireless transmitter/receiver 223, and the controller 220 of the mobile imaging unit 21 may detect an event by using the audio data as audio data different from the audio data collected by the sound collector 213.

In the present embodiment, the size for movie clipping is determined under the assumption of creating a high-definition digest, but the present invention is not limited thereto. The size for movie clipping may be determined under the assumption of creating a DVD with standard definition (SD) image quality (720 pixels×480 pixels).

In the present embodiment, the digest creating device 23 and the digest distribution server 26 are different devices, but the present invention is not limited thereto. A digest distribution function may be incorporated into a digest creating device to obtain a single device.

In the present embodiment, a highlight scene section is determined based on both the motion type and the sound type as illustrated in FIG. 16A and FIG. 16B, but the present invention is not limited thereto. A highlight scene section may be determined by using only the motion type or the sound type. As described above, the use of both the motion type and the sound type is preferable in terms of increasing the reliability of highlight scene determination. However, the use of only the sound type eliminates the necessity of a motion analysis process using video data, and thus the load on the digest creating device and the time for creating a digest can be reduced accordingly.

Although only a digest movie is created in the present embodiment, the present invention is not limited thereto. It is also possible to create a snapshot collection by allowing a player to select images from a movie and record still images on a DVD. This can be realized by a known technique using the library software OpenCV.

Second Embodiment

Figure 19:
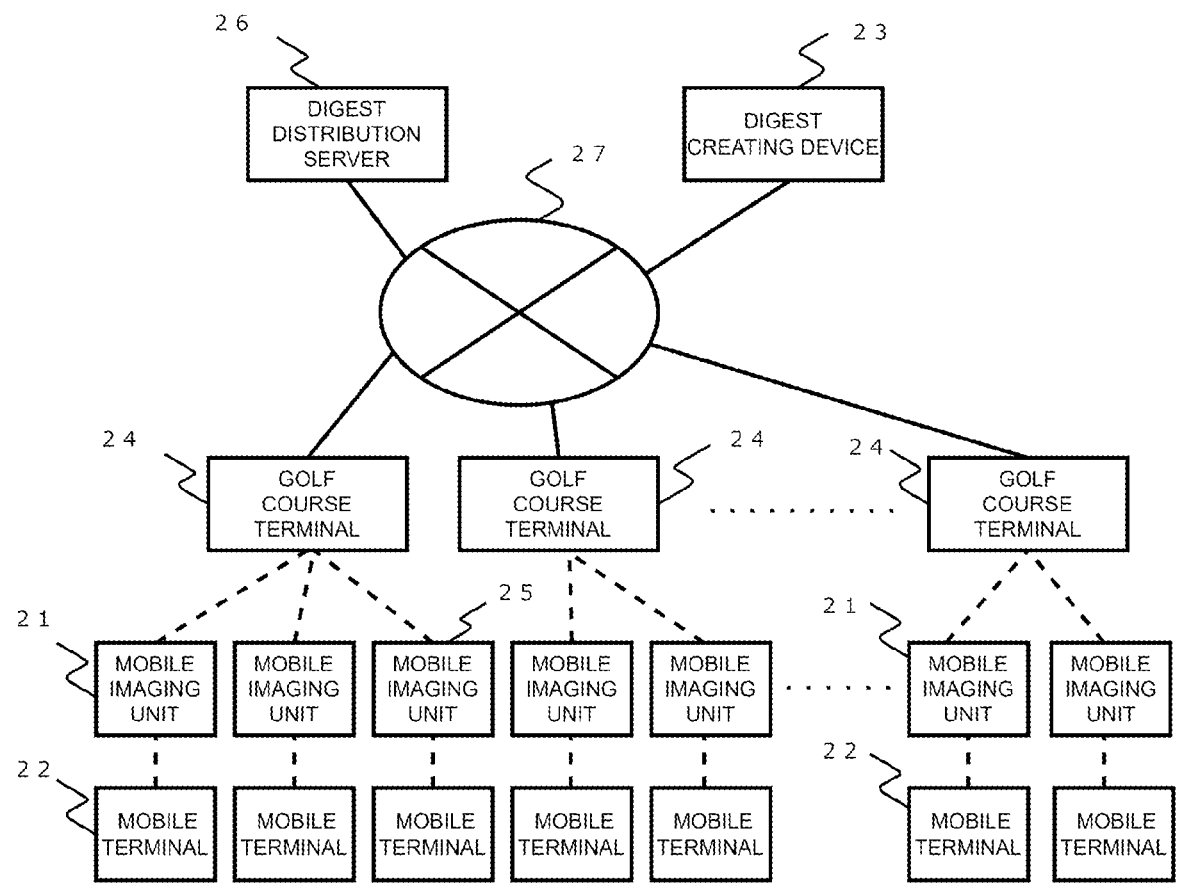
FIG. 19 is a diagram describing the configuration of a golf digest creating system according to a second embodiment of the present invention.

FIG. 19 is a diagram describing the configuration of a golf digest creating system according to a second embodiment of the present invention, which is different from the configuration of the first embodiment in that a fixed imaging unit 25 is provided, the fixed imaging unit 25 and the mobile imaging unit 21 transfer movie data and movement trace data to the digest creating device 23 via the golf course terminal 24, and a fifth generation mobile communication system is not used.

The fixed imaging unit 25 is installed in a case where it is necessary to stop a golf cart in an area where the golf cart is unable to enter or in a place where it is impossible to perform shooting by a camera on the golf cart, and is provided in a place where the state of play is not covered only by the shooting by the mobile imaging unit 21. Hereinafter, differences from the first embodiment will be described in detail.

First, the hardware configuration of the mobile imaging unit 21 will be described.

Figure 20:
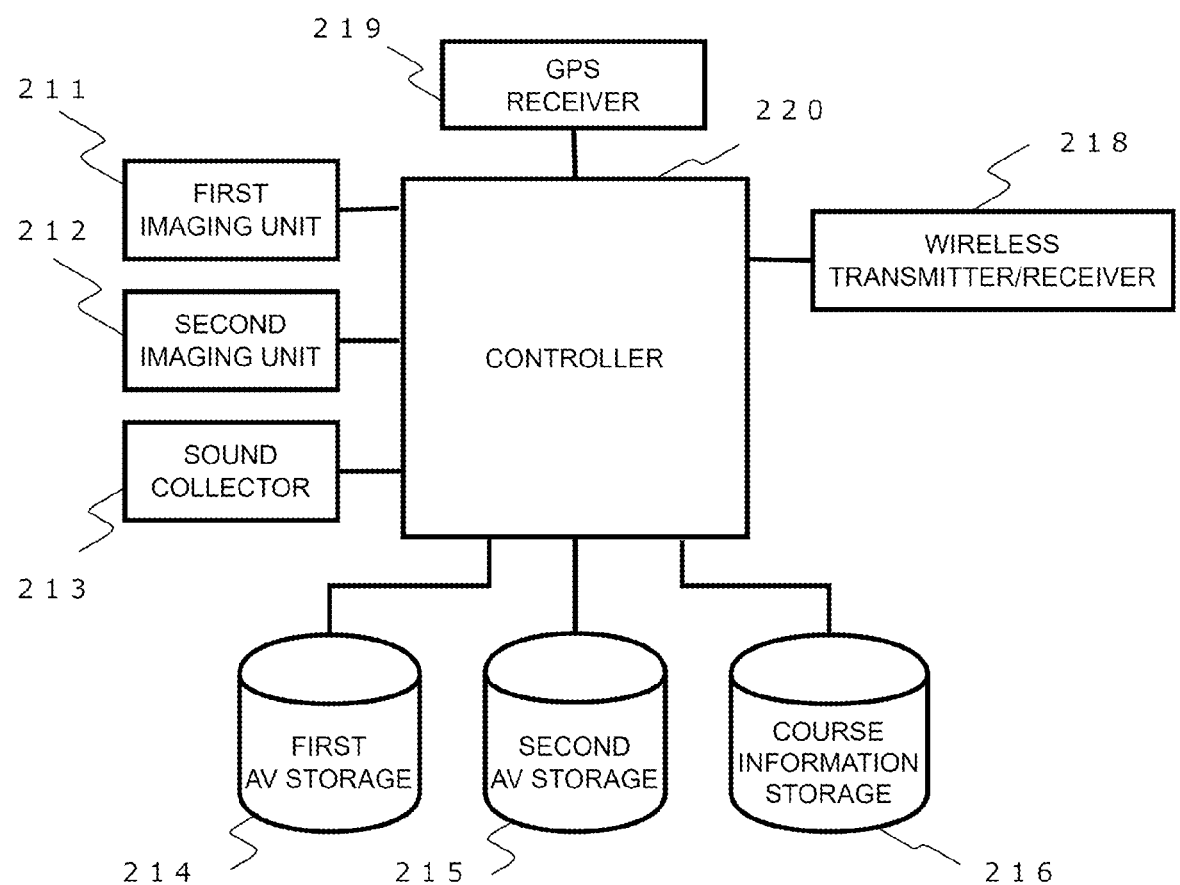
FIG. 20 is a diagram illustrating the hardware configuration of a mobile imaging unit according to the second embodiment of the present invention.

FIG. 20 is a diagram illustrating the configuration of the mobile imaging unit 21 according to the present embodiment.

Unlike in the first embodiment, the mobile imaging unit 21 does not include the 5G wireless transmitter/receiver 217, and performs transmission and reception with respect to the mobile terminal 22, the fixed imaging unit 25, and the golf course terminal 24 only by using the wireless transmitter/receiver 218 capable of medium-range wireless communication.

The three-dimensional map information stored in the course information storage 216 further includes information indicating a fixed imaging unit installation area and information indicating whether the second imaging unit 212 is capable of performing imaging in the area. Other than the above, the configuration is the same as that in the first embodiment.

Next, the hardware configuration of the fixed imaging unit 25 will be described.

Figure 21:
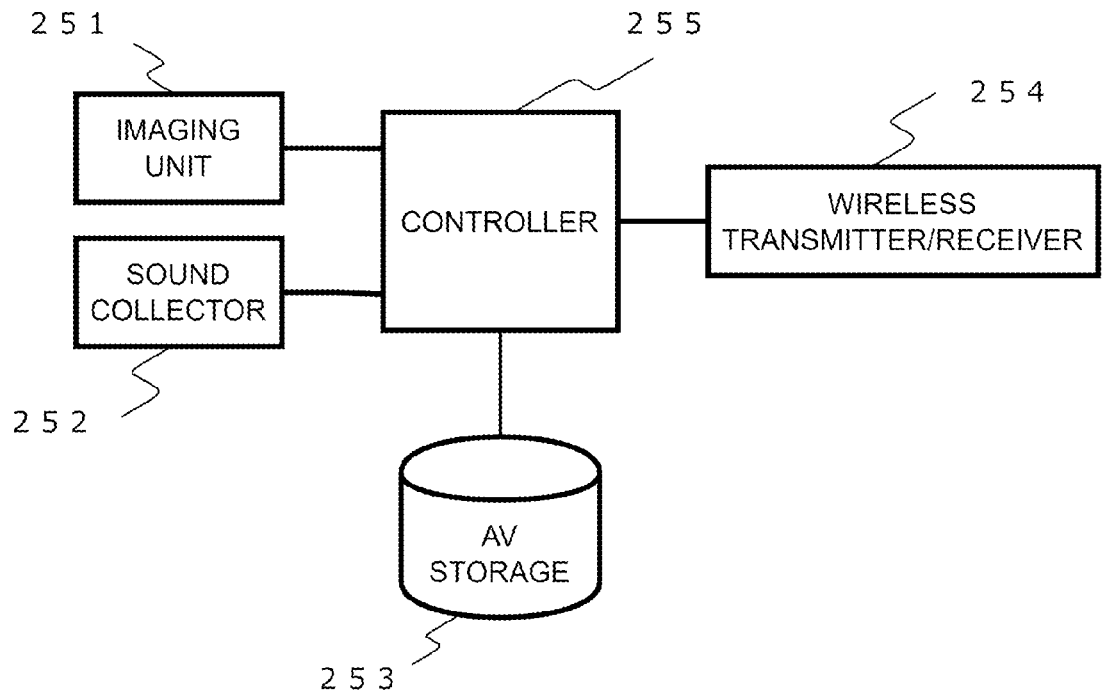
FIG. 21 is a diagram illustrating the hardware configuration of a fixed imaging unit according to the second embodiment of the present invention.

FIG. 21 is a diagram illustrating the hardware configuration of the fixed imaging unit 25 according to the second embodiment of the present invention.

Referring to FIG. 21, the fixed imaging unit 25 of the present embodiment includes an imaging unit 251 including a camera, a sound collector 252 including an audio microphone, an AV storage 253 that stores movie data, a wireless transmitter/receiver 254, and a controller 255. The camera has a limited imaging range, and thus performs imaging with full HD image quality (1,920 pixels×1,080 pixels) at a rate of 30 fps. At this time, an image is output, with distortion caused by a wide-angle lens of the camera being corrected.

The fixed imaging unit 25 is implemented by a camera, a microphone, a wireless communication device, and a computer device. The computer device includes a CPU, a memory, a nonvolatile storage, an input/output interface, and a wireless communication interface, which are connected to each other via a bus. In particular, the controller 255 loads a control program stored in the nonvolatile storage into the memory and executes the program, thereby implementing functions. Next, the hardware configuration of the golf course terminal 24 will be described.

Figure 22:
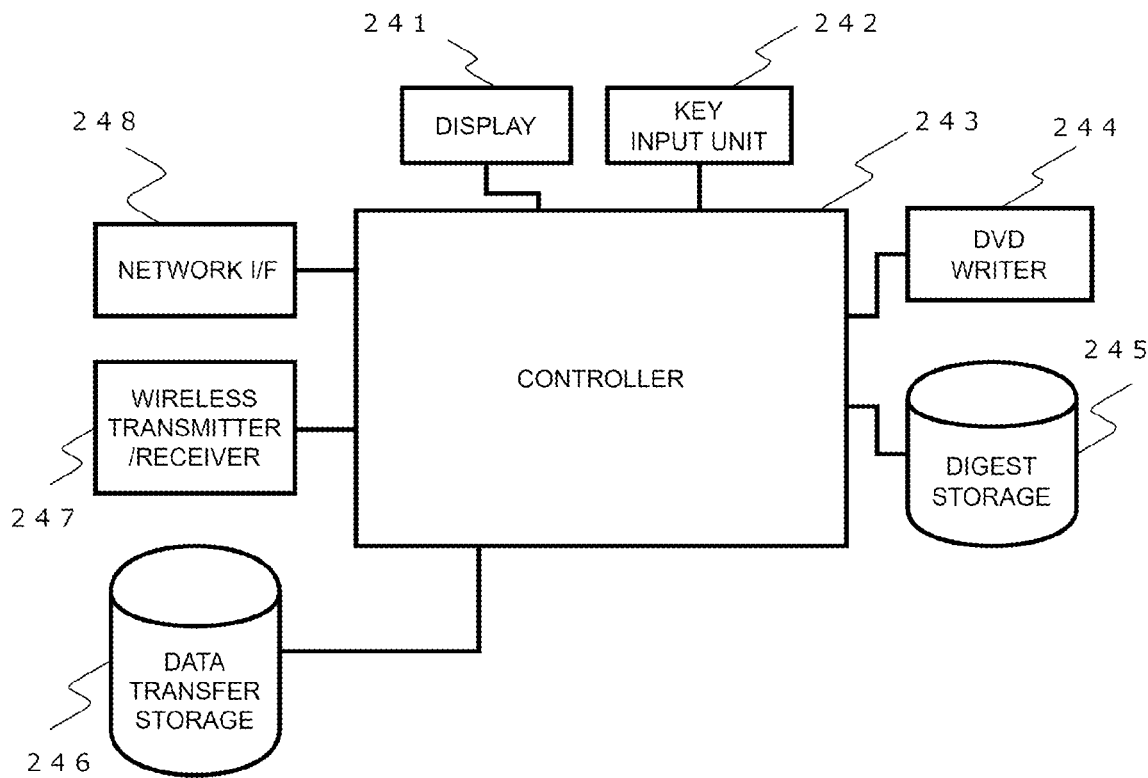
FIG. 22 is a diagram illustrating the hardware configuration of a golf course terminal according to the second embodiment of the present invention.

FIG. 22 is a diagram illustrating the hardware configuration of the golf course terminal 24 according to the present embodiment.

Referring to FIG. 22, the golf course terminal 24 includes a data transfer storage 246, a digest storage 245, a DVD writer 244, a key input unit 242, a display 241, a network I/F 248, a wireless transmitter/receiver 247, and a controller 243.

The data transfer storage 246 is a storage device that temporarily stores a 360-degree camera video data file, an optical zoom camera video data file, an audio data file, and a movement trace data file received from the mobile imaging unit 21 by wireless communication.

The digest storage 245 stores a digest file received from the digest distribution server 26.

The DVD writer 244 reads out a digest file stored in the digest storage 245 and writes the digest file on a DVD with full HD image quality.

The controller 243 controls the golf course terminal 24 as a whole and executes a digest providing service. The controller 243 displays a menu on the display 241, and instructs individual processing units constituting the golf course terminal 24 to perform processes selected by the key input unit 242.

The golf course terminal 24 is implemented by a display, a keyboard, a mouse, a DVD recorder, a network interface card, a wireless communication device, and a computer device. The computer device includes a CPU, a memory, a nonvolatile storage, an input/output interface, and a wireless communication interface, which are connected to each other via a bus. In particular, the controller 243 loads various programs stored in the nonvolatile storage into the memory and executes the programs, thereby implementing functions. As in the first embodiment, the golf course terminal 24 can be implemented by a personal computer having these hardware resources.

Next, the operations and functions of the mobile imaging unit 21, the fixed imaging unit 25, the golf course terminal 24, and the digest creating device 23 will be described with reference to the drawings.

Figure 23:
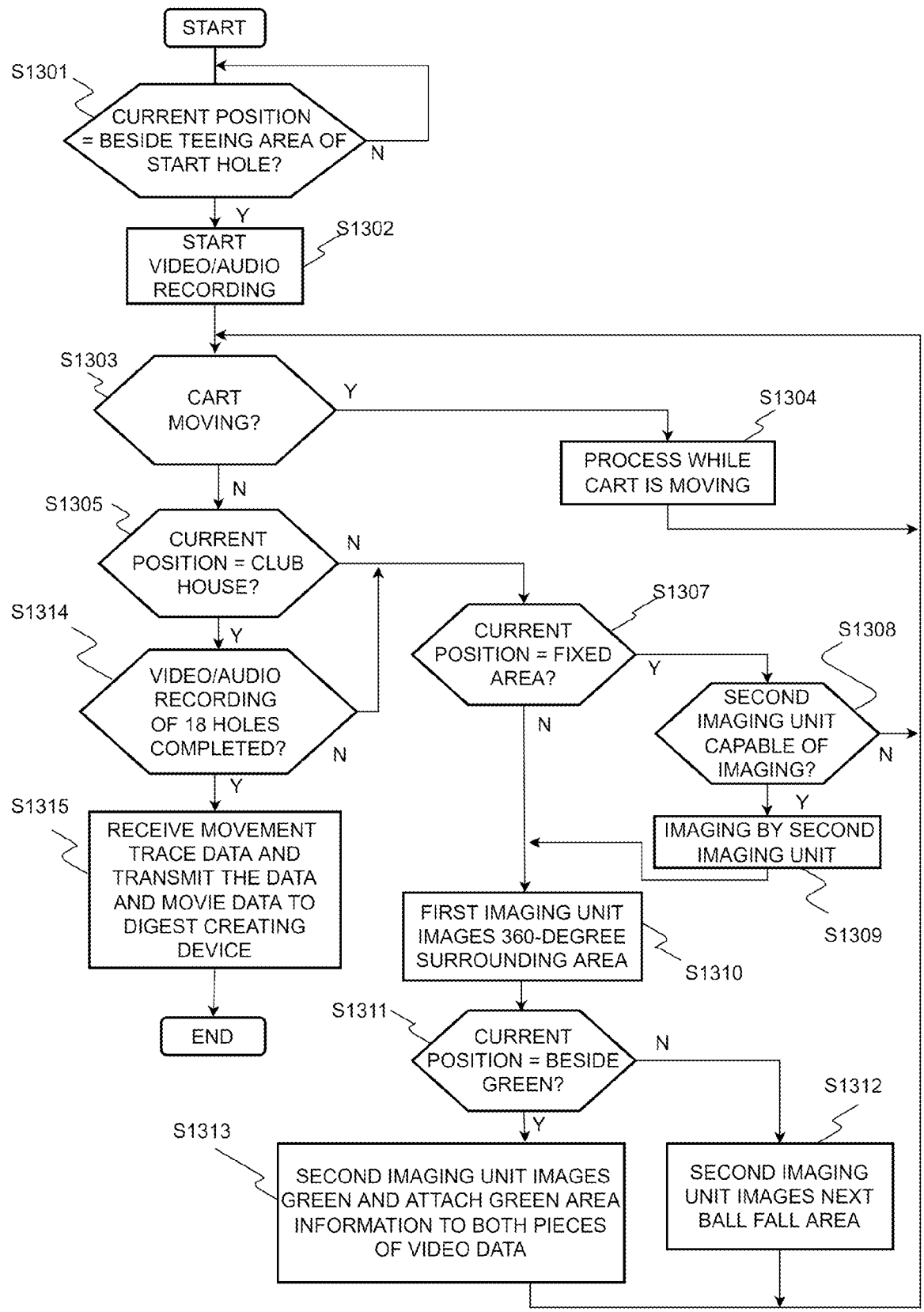
FIG. 23 is an operation flowchart of the mobile imaging unit according to the second embodiment of the present invention.

FIG. 23 is an operation flowchart of the mobile imaging unit 21 according to the second embodiment. The differences from the first embodiment will be described below.

The first difference is a process performed while the cart is moving (S1304).

Figure 24:
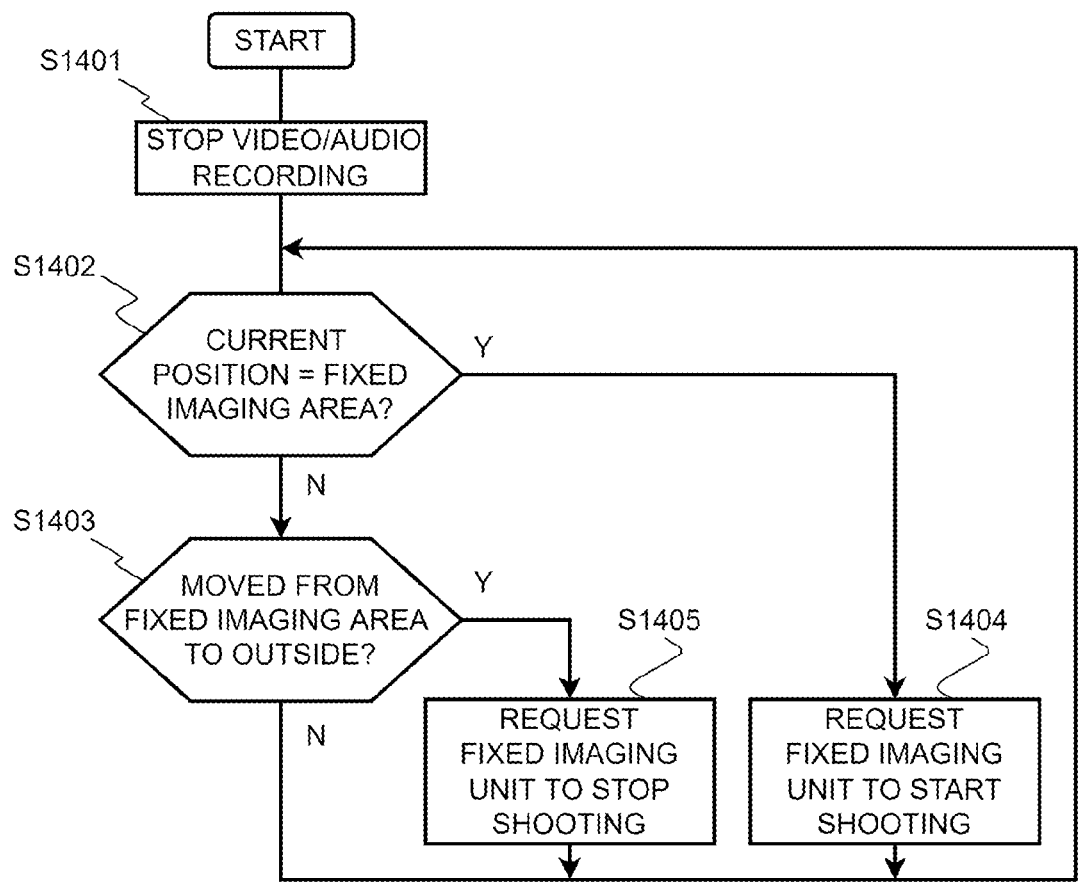
FIG. 24 is a flowchart of a process performed by the mobile imaging unit while a cart is moving according to the second embodiment of the present invention.

FIG. 24 is a flowchart describing a process performed by the mobile imaging unit 21 while the cart is moving.

Referring to FIG. 24, the controller 220 of the mobile imaging unit 21 stops imaging performed so far by the first imaging unit 211 and the second imaging unit 212 and video/audio recording (S1401).

Subsequently, the controller 220 determines whether the current position detected by the GPS receiver 219 is in the installation area of the fixed imaging unit 25 in the three-dimensional map information (S1402). Upon entry into the predetermined area, the controller 220 transmits a shooting start request and a golf cart number to the fixed imaging unit 25 in the area from the wireless transmitter/receiver 218 (S1404). Thereafter, the controller 220 waits until the golf cart stops.

On the other hand, if the current position is not in the installation area of the fixed imaging unit 25, the controller 220 determines whether the golf cart has moved from the fixed imaging area to the outside thereof (S1403). If the golf cart has moved to the outside, the controller 220 transmits a shooting stop request to the fixed imaging unit 25 (S1405). The above is the process performed by the mobile imaging unit 21 while the cart is moving.

The second difference is a process performed when the cart is stopped in an area other than the area of the club house.

That is, referring to FIG. 23, the mobile imaging unit 21 determines whether the current position is within the installation area of the fixed imaging unit 25 (step S1307). If the current position is within the installation area, the mobile imaging unit 21 determines whether the second imaging unit 212 is capable of imaging (S1308), and if possible, starts imaging by the second imaging unit 212 (S1309).

The subsequent operations are the same as steps S606 to S609 in the operation flowchart of the mobile imaging unit 21 of the first embodiment (FIG. 11).

The third difference is a process performed by the mobile imaging unit 21 after a round has finished.

That is, after a round has finished, the mobile imaging unit 21 receives movement trace data from the mobile terminal 22, and transmits the movement trace data and captured movie data to the digest creating device 23 via the golf course terminal 24 (S1315).

This is because, in the present embodiment, the mobile imaging unit 21 does not perform fifth generation mobile communication. When the golf cart returns to the club house after the round has finished, the mobile imaging unit 21 transmits all the movie data captured in the round and recorded in the first AV storage 214 and the second AV storage unit 215 and the movement trace data to the golf course terminal 24.

Figure 25:
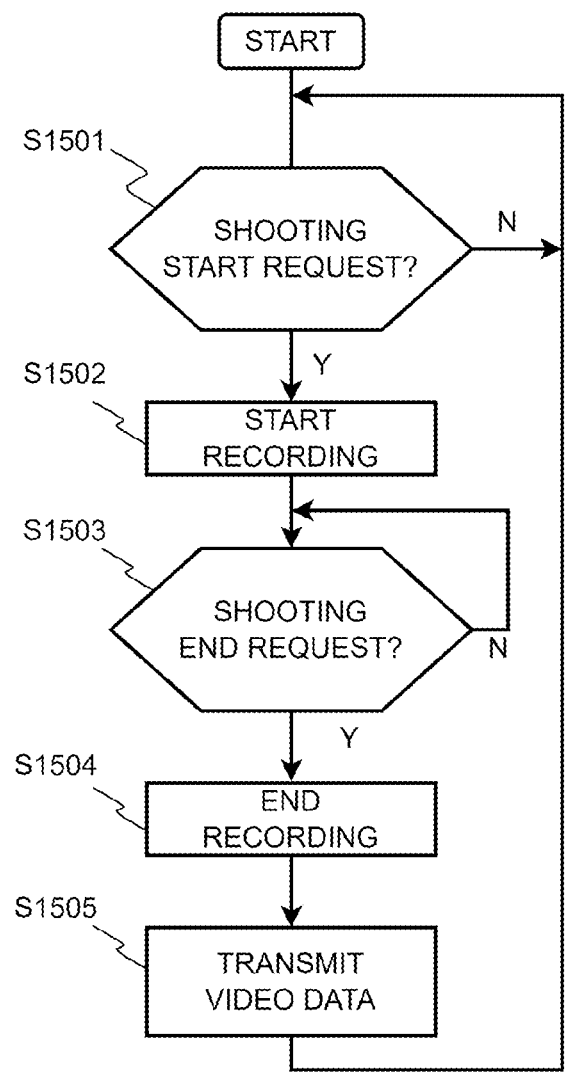
FIG. 25 is an operation flowchart of the fixed imaging unit according to the second embodiment of the present invention.

Next, the operation and function of the fixed imaging unit 25 will be described with reference to the drawings. FIG. 25 is an operation flowchart of the fixed imaging unit 25.

Referring to FIG. 25, the controller 255 of the fixed imaging unit 25 waits for a shooting start request from the mobile imaging unit 21 (S1501). In response to the request, the controller 255 starts video/audio recording of movie data from the imaging unit 251 and the sound collector 252 to the AV storage 253 (S1502). At this time, the controller 255 records a golf cart number notified together with the shooting start request in order to identify the movie data to be recorded, and the time at which the video/audio recording of the movie is started.

Subsequently, the controller 255 waits for a shooting end request from the mobile imaging unit 21 (S1503), and in response to the request, ends video/audio recording to the AV storage 253 (S1504).

Subsequently, the controller 255 of the fixed imaging unit 25 wirelessly transmits the recorded video data file and audio data file, and an attribute information file including the golf cart number, shooting start time information, a hole number, and area identification information, to the digest creating device 23 (S1505).

Subsequently, the controller 255 of the fixed imaging unit 25 returns to step S1501 for the next play group.

Figure 26:
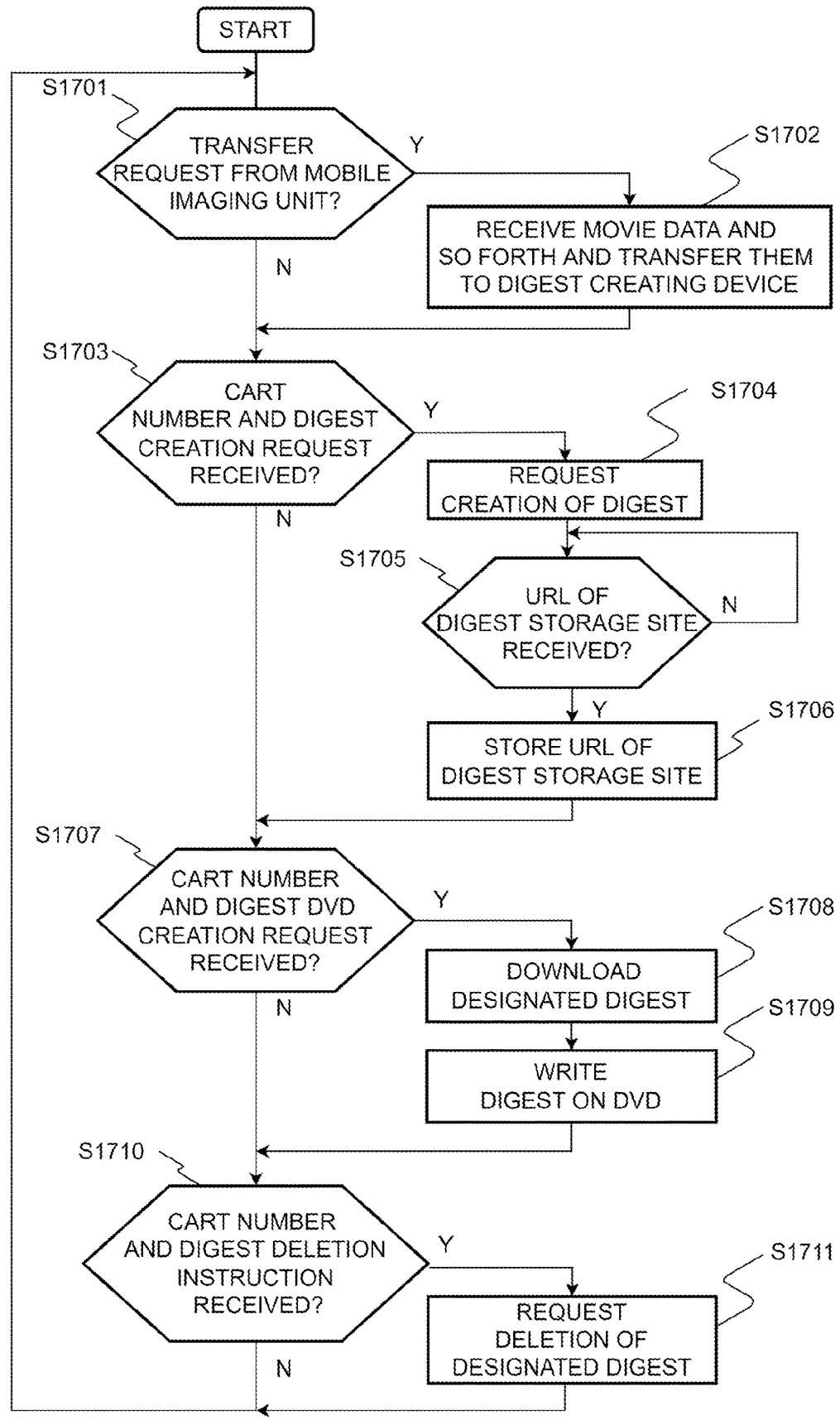
FIG. 26 is an operation flowchart of the golf course terminal according to the second embodiment of the present invention.

Next, the operation and function of the golf course terminal 24 will be described with reference to the drawings. FIG. 26 is an operation flowchart of the golf course terminal 24.

Referring to FIG. 26, the controller 243 of the golf course terminal 24 determines whether there is a movie data transfer request from the mobile imaging unit 21 (S1701). If there is a transfer request, the controller 243 permits transfer, and starts receiving a video data file, an audio data file, and a movement trace data file.

After receiving all the files into the data transfer storage 246, the controller 243 requests the digest creating device 23 to receive these files.

If the digest creating device 23 accepts the reception request, the golf course terminal 24 transmits all the received files, that is, the video data file, the audio data file, and the movement trace data file that are accompanied by the movie ID, to the digest crating device 23 by the FTP (S1702).

Subsequently, the controller 243 of the golf course terminal 24 checks the options displayed on the display 241.

The subsequent process from step S1703 to step S1711 is the same as the process from step S1201 to step S1209 in the operation flowchart of the golf course terminal 24 of the first embodiment (FIG. 18).

Next, the operation and function of the digest creating device 23 according to the present embodiment will be described.

Figure 27:
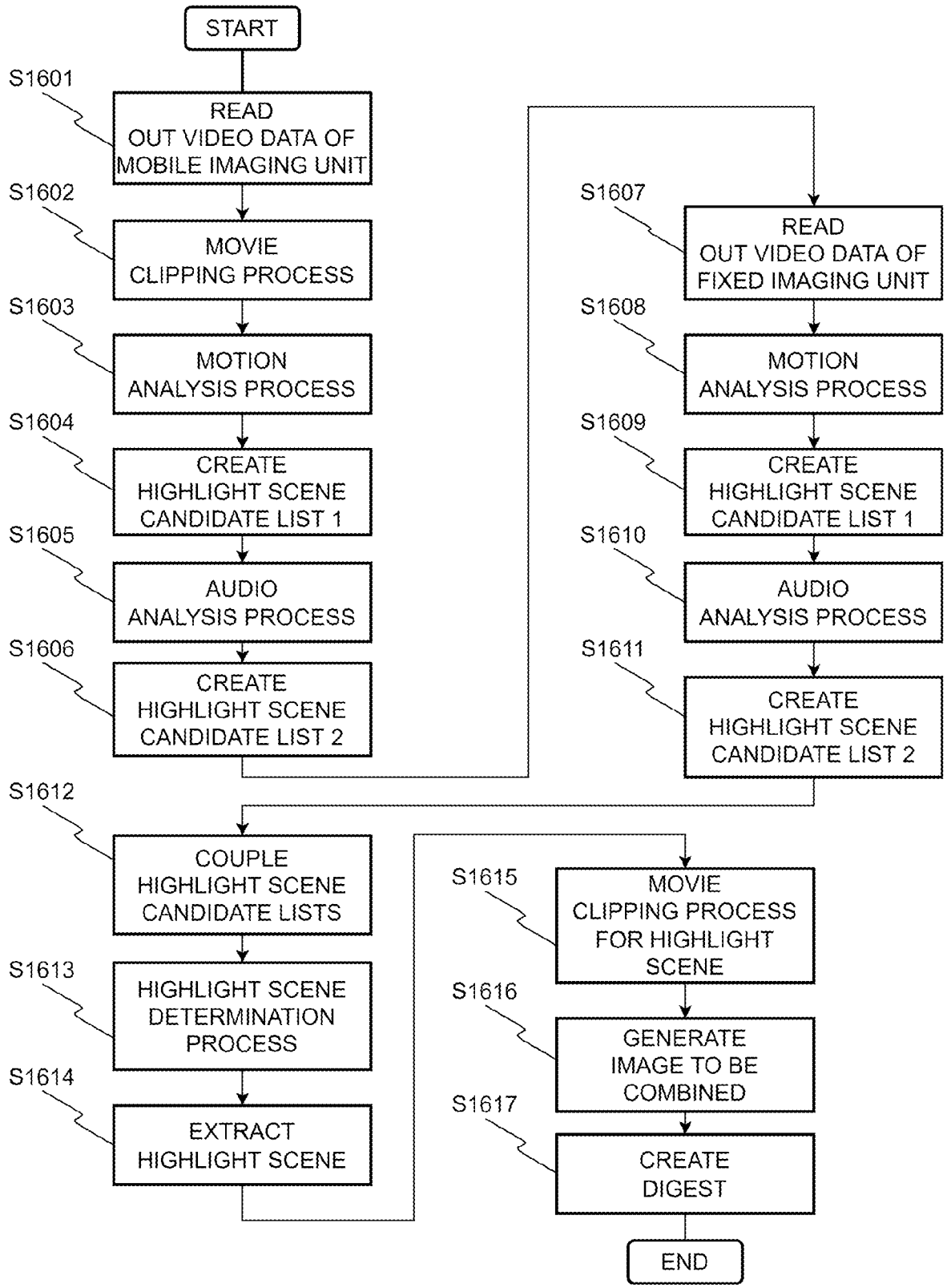
FIG. 27 is a flowchart of a digest creation process performed by a digest creating device according to the second embodiment of the present invention.
Figure 28:
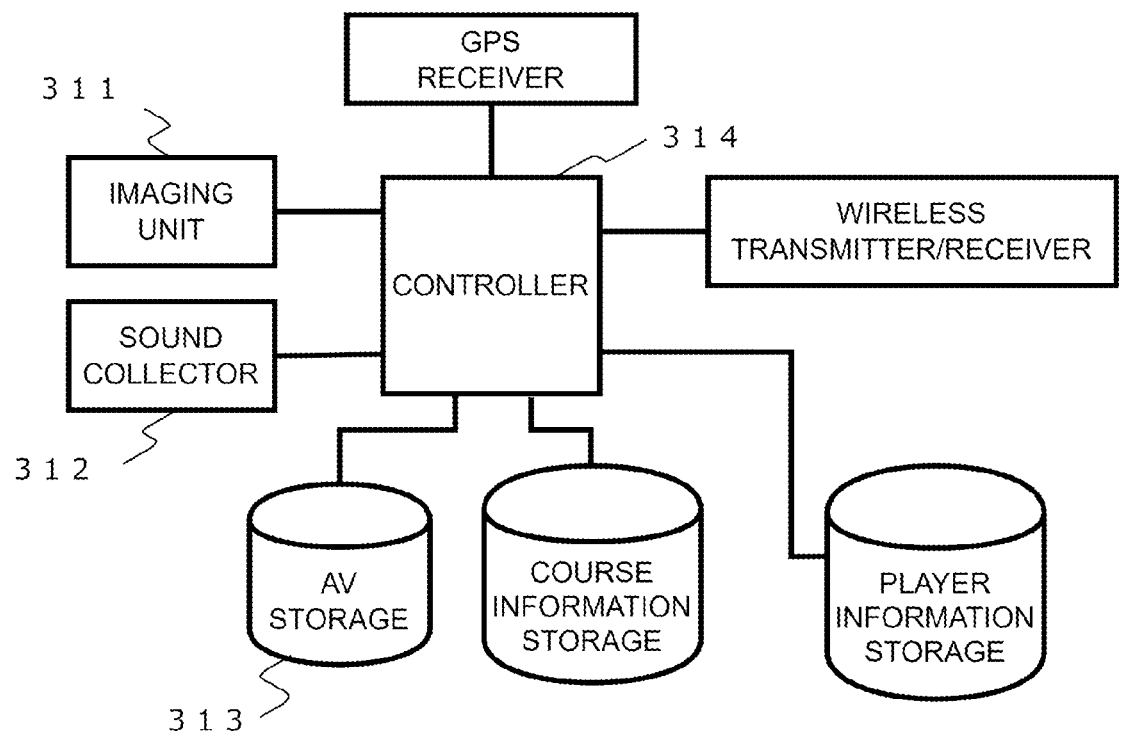
FIG. 28 is a diagram illustrating the hardware configuration of a mobile imaging unit included in an existing golf digest creating system.
Figure 29:
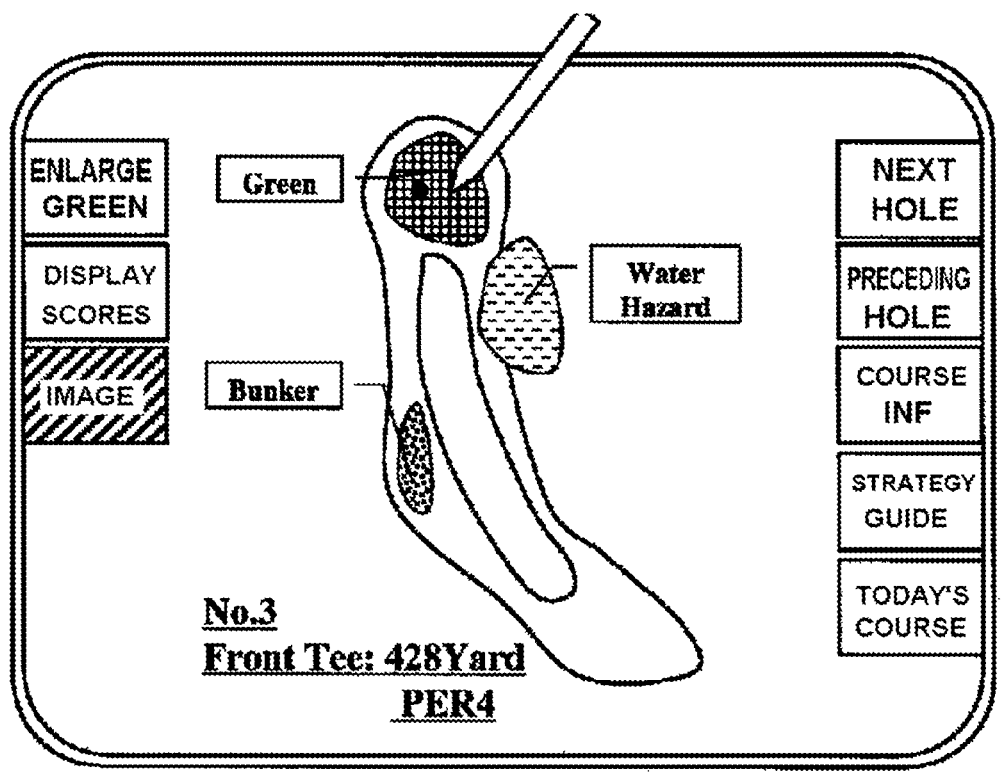
FIG. 29 is a diagram illustrating a display screen of an existing golf play library.
Figure 30:
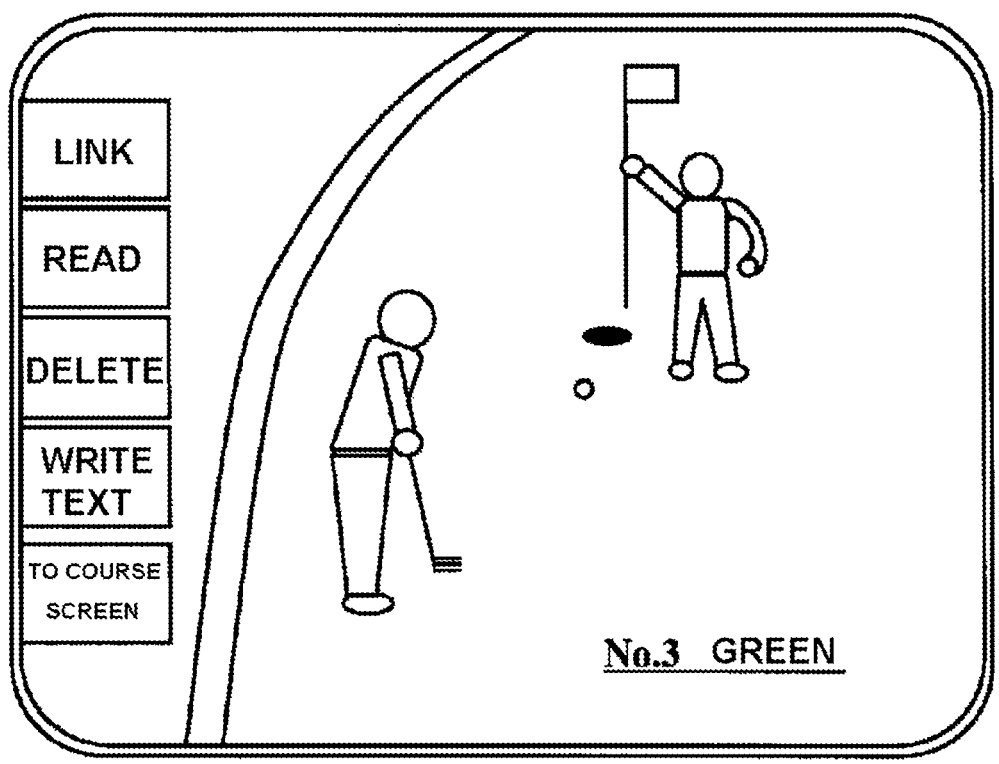
FIG. 30 is a diagram illustrating a display screen of the existing golf play library.

FIG. 27 is an operation flowchart of a digest creation process performed by the digest creating device 23.

Referring to FIG. 27, in response to receiving an instruction to create a digest, the controller 240 of the digest creating device 23 reads out a movie file having a notified golf cart number from the AVL storage 231 (S1601), and performs a process from the movie clipping process (S1602) to the creation of a highlight scene candidate list 2 (S1606) on the movie file captured by the mobile imaging unit 21, as in the first embodiment.

Subsequently, for the movie file captured by the fixed imaging unit 25, the controller 240 performs the same process as in the first embodiment from the motion analysis process (S1608) to the creation of a highlight scene candidate list 2 (S1611) without performing a movie clipping process after reading out video data (S1607). This is because only a limited space is imaged by the fixed camera.

Subsequently, the controller 240 couples all the highlight scene candidate lists in chronological order (S1612), and performs a process from the highlight scene determination process (S1613) to digest creation (S1617) as in the first embodiment. The digest has high image quality because both the movie captured by the mobile imaging unit 21 and the movie captured by the fixed imaging unit 25 have full HD image quality due to the up-conversion technique.

The operations of the mobile terminal 22 and the digest distribution server 26 are the same as those in the first embodiment.

As described above, in the present embodiment, a fixed imaging unit is disposed in an area where a golf cart is unable to enter, and thus it is possible to create a digest including highlight scenes in an area that is not covered only by shooting by the mobile imaging unit 21.

The golf digest creating system of the present embodiment only needs to be capable of communicating with the golf course terminal 24 by using a medium-range wireless communication device, without using a fifth generation mobile communication system. Thus, the golf digest creating system can be implemented even in an area where the service of the fifth generation wireless communication system is not provided, such as a mountainous area or a coastal area.

The present invention is useful for creating a digest of golf play, and is suitable for creating a digest of clearly visible highlight scenes without being concerned about shooting.

What is claimed is:

1. A golf digest creating system comprising:
   a mobile imaging unit; and
   a digest creating device,
   the mobile imaging unit including
      a 360-degree camera disposed at a position in an upper part of a golf cart, the position having a view of 360 degrees,
      a motorized-zoom-lens-equipped camera attached to a motorized camera platform disposed on the golf cart,
      a microphone and a Global Positioning System (GPS) receiver that are disposed on the golf cart,
      a direction detector configured to detect a lens direction of the motorized-zoom-lens-equipped camera,
      a course information storage storing map information of a golf course,
      an audio-visual (AV) storage configured to store first video data from the 360-degree camera, second video data from the motorized-zoom-lens-equipped camera, and audio data from the microphone, and
      a controller configured to
         determine an imaging target area by using position information detected by the GPS receiver and the map information,
         drive the motorized camera platform so that the lens direction detected by the direction detector is directed toward the imaging target area, and
         store the second video data captured in a magnified state by the motorized-zoom-lens-equipped camera, the first video data from the 360-degree camera, and the audio data in the AV storage, with the first video data, the second video data, and the audio data being accompanied by time information for synchronizing the first video data, the second video data, and the audio data with each other, and being accompanied by area identification information identifying the imaging target area, and
   the digest creating device including
      a data analyzer configured to perform image analysis on the first video data and the second video data stored in the AV storage and/or audio analysis on the audio data stored in the AV storage,
      a digest creator configured to extract a highlight scene in accordance with a result made by the data analyzer, and
      a controller configured to select, as video data to be subjected to the image analysis and extraction of the highlight scene, either the first video data from the 360-degree camera or the second video data from the motorized-zoom-lens-equipped camera in accordance with the area identification information accompanying the first video data and the second video data.

2. The golf digest creating system according to claim 1, wherein the controller of the mobile imaging unit is configured to, in a case where the position information detected by the GPS receiver indicates a position beside a green in the map information, determine the green to be an imaging target area of the motorized-zoom-lens-equipped camera.

3. The golf digest creating system according to claim 2, wherein the controller of the mobile imaging unit is configured to, in a case where the position information detected by the GPS receiver indicates a position that is not beside a green in the map information, determine a predetermined area in the map information to be the imaging target area, the predetermined area being a next fall area of a ball hit at the position indicated by the position information.

4. The golf digest creating system according to claim 2, wherein the controller of the digest creating device is configured to, in a case where the area identification information accompanying the first video data and the second video data indicates a green, select the second video data from the motorized-zoom-lens-equipped camera as the video data to be subjected to the image analysis and extraction of the highlight scene.

5. The golf digest creating system according to claim 3, wherein the controller of the digest creating device is configured to, in a case where the area identification information accompanying video data of the highlight scene does not indicate a green, replace the video data of the highlight scene after a shot with video data that is from the motorized-zoom-lens-equipped camera and that has the same time as the video data of the highlight scene.

6. The golf digest creating system according to claim 1, further comprising:
a mobile terminal including a GPS receiver and configured to record position information at a predetermined time interval to create movement trace information of a player, wherein
the 360-degree camera of the mobile imaging unit includes an azimuth sensor and is configured to attach azimuth information to the first video data to be output,
the controller of the mobile imaging unit is configured to store the first video data and the second video data in the AV storage, with the first video data and the second video data being accompanied by the position information of the golf cart,
the digest creating device further includes a map information storage storing three-dimensional map information of the golf course, and
the digest creator is configured to
specify a position of the player by using the azimuth information accompanying the first video data from the 360-degree camera, the position information of the golf cart, and the movement trace information acquired from the mobile terminal, at a time of occurrence of the highlight scene,
calculate topographic information at the position by using the three-dimensional map information, and
combine the topographic information with video data of the highlight scene.

7. A mobile imaging unit comprising: a 360-degree camera disposed at a position in an upper part of a golf cart, the position having a view of 360 degrees; a motorized-zoom-lens-equipped camera attached to a motorized camera platform disposed on the golf cart; a microphone and a Global Positioning System (GPS) receiver that are disposed on the golf cart; a direction detector configured to detect a lens direction of the motorized zoom-lens-equipped camera; a course information storage storing map information of a golf course; an audio-visual (AV) storage configured to store first video data from the 360-degree camera, second video data from the motorized-zoom-lens-equipped camera, and audio data from the microphone; and a controller configured to determine an imaging target area by using position information detected by the GPS receiver and the map information, drive the motorized camera platform so that the lens direction detected by the direction detector is directed toward the imaging target area, and store the second video data captured in a magnified state by the motorized-zoom-lens-equipped camera, the first video data from the 360-degree camera, and the audio data in the AV storage, with the first video data, the second video data, and the audio data being accompanied by time information for synchronizing the first video data, the second video data, and the audio data with each other, and being accompanied by area identification information identifying the imaging target area, so as to allow image analysis to be performed on the first video data and the second video data stored in the AV storage and/or audio analysis on the audio data stored in the AV storage, and allow a Highlight scene to be extracted in accordance with a result of the image analysis and/or audio analysis.

8. A digest creating device comprising:
a digest creation audio-visual (AV) storage configured to store first video data from a 360-degree camera disposed on a golf cart, second video data from a motorized-zoom-lens-equipped camera attached to a motorized camera platform, and audio data from a microphone disposed on the golf cart, with the first video data, the second video data, and the audio data being accompanied by time information for synchronizing the first video data, the second video data, and the audio data with each other, and being accompanied by area identification information identifying an imaging target area;
a data analyzer configured to perform image analysis on the first video data and/or the second video data stored in the digest creation AV storage and/or audio analysis on the audio data stored in the digest creation AV storage;
a digest creator configured to extract a highlight scene in accordance with a result made by the data analyzer; and
a controller configured to select, as video data to be subjected to the image analysis and extraction of the highlight scene, either the first video data from the 360-degree camera or the second video data from the motorized-zoom-lens-equipped camera in accordance with the area identification information accompanying the first video data and the second video data.

* * * * *